US012809648B2

(12) United States Patent
Jiang et al.

(10) Patent No.: US 12,809,648 B2
(45) Date of Patent: Nov. 24, 2026

(54) WALLPAPER DISPLAY METHOD AND ELECTRONIC DEVICE

(71) Applicant: Huawei Technologies Co., Ltd., Shenzhen (CN)

(72) Inventors: Hua Jiang, Nanjing (CN); Xiaoxiao Chen, Shenzhen (CN); Wenbin You, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 18/740,830

(22) Filed: Jun. 12, 2024

(65) Prior Publication Data

US 2024/0330024 A1 Oct. 3, 2024

Related U.S. Application Data

(63) Continuation of application No. PCT/CN2022/138406, filed on Dec. 12, 2022.

(30) Foreign Application Priority Data

Dec. 13, 2021 (CN) ......................... 202111521847.0
Jan. 10, 2022 (CN) ......................... 202210023547.8

(51) Int. Cl.
*G06F 3/048* (2013.01)
*G06F 3/14* (2006.01)
*G06F 9/451* (2018.01)

(52) U.S. Cl.
CPC ............ *G06F 9/451* (2018.02); *G06F 3/1423* (2013.01)

(58) Field of Classification Search
None
See application file for complete search history.

(56) References Cited

U.S. PATENT DOCUMENTS

2012/0210263 A1* 8/2012 Perry .................... G06F 3/0484 715/769
2014/0257962 A1* 9/2014 Franzetti ............ G06Q 30/0231 705/14.27
2015/0074561 A1* 3/2015 Zhou ....................... G06F 9/451 715/779
2015/0113455 A1* 4/2015 Kang .................. G06F 3/04842 715/765

(Continued)

FOREIGN PATENT DOCUMENTS

CN 104199681 A 12/2014
CN 104317499 A 1/2015

(Continued)

*Primary Examiner* — Thanh T Vu
(74) *Attorney, Agent, or Firm* — Slater Matsil, LLP

(57) ABSTRACT

A method, electronic device, and non-transitory computer readable medium are discussed, an example method includes displaying a first window on a first display, and displaying a second window on a second display. The first window includes first content used as a wallpaper of the first display, or the second window includes second content used as a wallpaper of the second display. The example method includes, in response to an operation of setting first target content as the wallpaper of the second display by a user, displaying a third window on the second display, and displaying the first target content in the third window. The third window covers the second window.

20 Claims, 22 Drawing Sheets

(56) References Cited

U.S. PATENT DOCUMENTS

| | | | | |
|---|---|---|---|---|
| 2018/0314391 | A1* | 11/2018 | Beerana | G06F 3/147 |
| 2020/0244940 | A1 | 7/2020 | Li et al. | |
| 2022/0397985 | A1* | 12/2022 | Singh | G06F 3/0481 |

FOREIGN PATENT DOCUMENTS

| | | | |
|---|---|---|---|
| CN | 108196779 | A | 6/2018 |
| CN | 110968229 | A | 4/2020 |

* cited by examiner

TO

Original wallpaper picture

CONT.
FROM

TO

Primary screen

CONT. FROM FIG. 1e-2

Secondary screen

FIG. 7
First window
5G
5G
8:00
08:00
Thursday, January 1
Camera
Contacts
Phone
Messaging
Browser
Second window
0800
Jan 1
888
First display
Second display

Third interface

First display

Second display

First display

Second display

Second display

WALLPAPER DISPLAY METHOD AND ELECTRONIC DEVICE

CROSS-REFERENCE TO RELATED APPLICATIONS

This application is a continuation of International Application No. PCT/CN2022/138406, filed on Dec. 12, 2022, which claims priority to Chinese Patent Application No. 202111521847.0, filed on Dec. 13, 2021 and Chinese Patent Application No. 202210023547.8, filed on Jan. 10, 2022. All of the aforementioned patent applications are hereby incorporated by reference in their entireties.

TECHNICAL FIELD

This application relates to the field of electronic device technologies, and in particular, to a wallpaper display method and an electronic device.

BACKGROUND

A multi-screen electronic device is an electronic device having a plurality of displays, for example, a foldable device that is currently widely applied. The foldable device is an intelligent terminal device whose display can be folded or bent. Currently, there are more foldable device products, and there are more folding manners of the foldable device products. For example, the foldable device may be folded in a plurality of manners such as folded inward, folded outward, and folded horizontally. Based on these folding manners, the foldable device can implement different screen display. Currently, most foldable devices have two displays, and the two displays may separately perform displaying in different folding states.

The plurality of displays of the multi-screen electronic device may be classified into a primary screen and a secondary screen. Currently, there are mainly the following three implementations for theme settings of the displays of the multi-screen electronic device:

(1) A theme may be set and a wallpaper may be displayed on the primary screen. A theme cannot be set on the secondary screen and no wallpaper is displayed on the secondary screen. That is, the wallpaper does not take effect on the secondary screen.

(2) A theme may be set and a wallpaper may be displayed on the primary screen. A theme cannot be set on the secondary screen but the wallpaper may be displayed on the secondary screen. In this manner, a wallpaper size is adjusted through cropping or auto-adaptation, so that the same wallpaper may be displayed on both the primary screen and the secondary screen, that is, the wallpaper takes effect on both the primary screen and the secondary screen.

(3) A theme may be set and a wallpaper may be displayed on the primary screen. A theme cannot be set on the secondary screen but a wallpaper may be displayed on the secondary screen. In this manner, wallpapers displayed on the primary screen and the secondary screen are different, and if the wallpaper needs to be changed, the wallpapers of the primary screen and the secondary screen need to be changed together.

Flexibility and use experience of displaying a wallpaper in the foregoing three existing implementations are poor.

SUMMARY

This application provides a wallpaper display method and an electronic device, so as to implement separate setting and display of wallpapers of different displays of the electronic device, and improve flexibility and use experience of displaying the wallpapers by the electronic device.

According to a first aspect, an embodiment of this application provides a wallpaper display method, applied to an electronic device. The method includes: displaying a first window on a first display, and displaying a second window on a second display, where the first window includes first content used as a wallpaper of the first display, and/or the second window includes second content used as a wallpaper of the second display; and in response to an operation of setting first target content as the wallpaper of the second display by a user, displaying a third window on the second display, and displaying the first target content in the third window, where the third window covers the second window.

In the method, the first window and the second window may be native wallpaper display windows of the electronic device, and the third window may be an added window for displaying the wallpaper of the second display. The wallpaper is displayed by adding the third window that covers the second window, so that a presentation effect that the wallpaper in the third window is visible and the wallpaper in the second window is invisible can be implemented. Therefore, by using this solution, the electronic device can separately control the wallpaper of the second display without affecting a native wallpaper display solution and without being affected by the native wallpaper display solution. In view of this, wallpapers displayed on the two displays of the electronic device may be separately set and managed. This can improve flexibility of displaying the wallpapers by the electronic device, so that the user can flexibly adjust wallpapers displayed on different displays of the electronic device based on an actual requirement, and can improve use experience.

In a possible design, the first display is a primary screen, and the second display is a secondary screen; or the first display is a secondary screen, and the second display is a primary screen.

In the method, when the second display is the secondary screen, the electronic device may separately set the wallpaper of the secondary screen. Alternatively, when the second display is the primary screen, the electronic device may separately set the wallpaper of the primary screen. Therefore, by using this solution, the electronic device may separately set the wallpaper of the primary screen or the secondary screen, without affecting display of another display.

In a possible design, the first target content is different from the second content; or a part of the first target content is from the second content.

In the method, the electronic device may display newly obtained content as the wallpaper of the second display, or may select a part of content of the wallpaper currently displayed on the second display, and add the newly obtained content to the part of the content, where finally obtained content is displayed as the wallpaper of the second display. In view of this, the electronic device may select content as the wallpaper from a plurality of aspects, and flexibility is higher.

In a possible design, an entire region of the third window is a non-transparent region; or a partial region of the third window is a transparent region.

In the method, when the entire region of the third window is the non-transparent region, an effect of replacing the wallpaper on the second display may be presented as a visual effect. Therefore, when the effect is presented to the user, an effect of updating the wallpaper in the second display may be implemented. When the partial region of the third window is the transparent region, content that is in the second window and that corresponds to the transparent region is visible to the user. Therefore, in terms of a visual presentation effect, the original wallpaper in the second window and the wallpaper set by the user in the third window may be combined to display a final wallpaper. In the foregoing manner, the electronic device may present the wallpaper of the second display to the user more flexibly and in a more diversified manner.

In a possible design, the method further includes: displaying a fourth window on the second display, where the fourth window covers the third window, and the fourth window includes third content.

In the method, after displaying the wallpaper of the second display, the electronic device may continue to display the fourth window on a wallpaper window, namely, the third window, so that content in the third window is used as background content, to implement a function of the wallpaper in the third window.

In a possible design, the third content includes at least one element, and a region other than the at least one element in the fourth window is a non-transparent region.

In the method, elements displayed in the fourth window may be opaque and visible to the user, and regions other than these elements are transparent, so that content that is in the third window and that corresponds to these transparent regions is visible to the user. Therefore, in the method, an effect of presenting content in the fourth window to the user by using the content in the third window as a background may be implemented.

In a possible design, the element includes a control and/or an icon.

In the method, the element in the fourth window includes content such as a control and an icon. With reference to the wallpaper displayed in the third window, the electronic device may display an interface like a desktop or an application interface. In this way, when the wallpaper of the second display is flexibly set, display of various user interfaces such as the desktop and the application interface is not affected.

In a possible design, the method further includes: in response to an operation of setting second target content as the wallpaper of the second display by the user, updating the first target content in the third window to the second target content.

In the method, after the electronic device displays the wallpaper of the second display in the third window based on the setting of the user, if the user changes the setting of the wallpaper of the second display, the electronic device may continue to update the wallpaper in the third window for display. Therefore, this does not affect a display procedure of the wallpaper in the second window, and is not be affected by the wallpaper in the second window. The wallpaper of the second display presented to the user may be flexibly changed based on a user requirement, so as to improve user experience.

In a possible design, the updating the first target content in the third window to the second target content includes: obtaining first target configuration information, where the first target configuration information is used to configure the second target content as the wallpaper of the second display; replacing stored second target configuration information with the first target configuration information, where the second target configuration information is used to configure the first target content as the wallpaper of the second display; and displaying the second target content in the third window based on a configuration of the first target configuration information.

In the method, the electronic device may update, by replacing configuration information of the wallpaper, the wallpaper displayed in the third window. This is flexible, and an implementation process is simple and fast, so that the wallpaper on the second display can be quickly updated for display.

In a possible design, the method further includes: in response to an operation of setting third target content as the wallpaper of the first display by the user, updating the first content in the first window to the third target content, where content in the second window changes with an update of content in the first window, and content in the third window remains unchanged.

In the method, the electronic device may update the wallpaper displayed on the first display by updating the content in the first window. When the content in the first window is updated, the content in the second window changes accordingly, but the content in the third window may remain unchanged. In view of this, although the content in the second window changes due to the update of the content in the first window, the content in the third window remains unchanged, so that it can be ensured that the wallpaper presented by the second display to the user remains unchanged, and is still the content in the third window. Therefore, an effect that is of separately setting the wallpaper of the first display and that is visible to the user can be implemented.

In a possible design, the updating the first content in the first window to the third target content includes: obtaining third target configuration information, where the third target configuration information is used to configure the third target content as the wallpaper of the first display; replacing stored fourth target configuration information with the third target configuration information, where the fourth target configuration information is used to configure the first content as the wallpaper of the first display; and displaying the third target content in the first window based on a configuration of the third target configuration information.

In the method, the electronic device may update, by replacing configuration information of the wallpaper, the wallpaper displayed in the first window. This is flexible, and an implementation process is simple and fast, so that the wallpaper on the first display can be quickly updated for display.

In a possible design, the first target content is a picture, a video, or an animation.

In the method, the electronic device may display a plurality of different types of wallpapers on the second display, so that user experience can be improved.

In a possible design, a size of the third window is greater than or equal to a size of the second window.

In the method, the size of the third window is greater than or equal to the size of the second window. In this way, it can be ensured that the third window can completely cover the second window, so that the content displayed in the third window is presented to the user, so as to reduce or avoid impact of the content in the second window on the content displayed in the third window.

According to a second aspect, an embodiment of this application provides an electronic device. The electronic device includes: a first display unit, configured to: display a first window on a first display, and display a second window on a second display, where the first window includes first content used as a wallpaper of the first display, and/or the second window includes second content used as a wallpaper of the second display; and a second display unit, configured to: in response to an operation of setting first target content as the wallpaper of the second display by a user, display a third window on the second display, and display the first target content in the third window, where the third window covers the second window.

In a possible design, the first display is a primary screen, and the second display is a secondary screen; or the first display is a secondary screen, and the second display is a primary screen.

In a possible design, the first target content is different from the second content; or a part of the first target content is from the second content.

In a possible design, an entire region of the third window is a non-transparent region; or a partial region of the third window is a transparent region.

In a possible design, the electronic device further includes a third display unit, configured to display a fourth window on the second display, where the fourth window covers the third window, and the fourth window includes third content.

In a possible design, the third content includes at least one element, and a region other than the at least one element in the fourth window is a non-transparent region.

In a possible design, the element includes a control and/or an icon.

In a possible design, the second display unit is further configured to: in response to an operation of setting second target content as the wallpaper of the second display by the user, update the first target content in the third window to the second target content.

In a possible design, that the second display unit updates the first target content in the third window to the second target content includes: obtaining first target configuration information, where the first target configuration information is used to configure the second target content as the wallpaper of the second display; replacing stored second target configuration information with the first target configuration information, where the second target configuration information is used to configure the first target content as the wallpaper of the second display; and displaying the second target content in the third window based on a configuration of the first target configuration information.

In a possible design, the first display unit is further configured to: in response to an operation of setting third target content as the wallpaper of the first display by the user, update the first content in the first window to the third target content, where content in the second window changes with an update of content in the first window, and content in the third window remains unchanged.

In a possible design, that the first display unit updates the first content in the first window to the third target content includes: obtaining third target configuration information, where the third target configuration information is used to configure the third target content as the wallpaper of the first display; replacing stored fourth target configuration information with the third target configuration information, where the fourth target configuration information is used to configure the first content as the wallpaper of the first display; and displaying the third target content in the first window based on a configuration of the third target configuration information.

In a possible design, the first target content is a picture, a video, or an animation.

In a possible design, a size of the third window is greater than or equal to a size of the second window.

According to a third aspect, an embodiment of this application provides an electronic device. The electronic device includes a plurality of displays, a memory, and one or more processors. The memory is configured to store computer program code, and the computer program code includes computer instructions. When the computer instructions are executed by the one or more processors, the electronic device is enabled to perform the method described in the first aspect or any one of the possible designs of the first aspect.

According to a fourth aspect, this application provides a computer-readable storage medium. The computer-readable storage medium stores a computer program. When the computer program is run on a computer, the computer is enabled to perform the method described in the first aspect or any one of the possible designs of the first aspect.

According to a fifth aspect, this application provides a computer program product. The computer program product includes a computer program or instructions. When the computer program or the instructions are run on a computer, the computer is enabled to perform the method described in the first aspect or any one of the possible designs of the first aspect.

For beneficial effects of the second aspect to the fifth aspect, refer to the descriptions of the beneficial effects of the first aspect. Details are not described herein again.

BRIEF DESCRIPTION OF THE DRAWINGS

FIG. 2 is a schematic diagram of a hardware architecture of an electronic device according to an embodiment of this application;

FIG. 3 is a schematic diagram of a software architecture of an electronic device according to an embodiment of this application;

DETAILED DESCRIPTION OF ILLUSTRATIVE EMBODIMENTS

Figure 1A:
FIG. 1*a* is a schematic diagram of a method for setting a wallpaper by a single-screen electronic device.

To make objectives, technical solutions, and advantages of embodiments of this application clearer, the following further describes embodiments of this application in detail with reference to the accompanying drawings. The terms "first" and "second" below in the descriptions of the embodiments of this application are merely used for a description purpose, and shall not be understood as an indication or implication of relative importance or implicit indication of a quantity of indicated technical features. Therefore, a feature limited by "first" or "second" may explicitly or implicitly include one or more features.

For ease of understanding, examples of descriptions of concepts related to this application are provided for reference.

(1) An electronic device is a device having a plurality of displays. In some embodiments of this application, the electronic device may be a portable device having a plurality of displays, or may be a foldable screen device, for example, a mobile phone, a tablet computer, a wearable device (for example, a watch or a band), a vehicle-mounted terminal device, an augmented reality (AR) device/a virtual reality (VR) device, a notebook computer, an ultra-mobile personal computer (UMPC), a netbook, a personal digital assistant (PDA), a smart home device (for example, a smart television), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, or an uncrewed aerial vehicle, or an aircraft).

In some embodiments of this application, the electronic device may alternatively be a portable terminal device that further includes another function, for example, personal digital assistant and/or audio and video playing functions. An example embodiment of the portable terminal device includes but is not limited to a portable terminal device that carries an operating system like Android®. It should be further understood that, in some other embodiments of this application, the electronic device may not be a portable terminal device, but a desktop computer having a plurality of displays.

(2) A foldable screen device is an electronic device whose display is foldable, and may also be referred to as a "foldable electronic device", a "foldable screen electronic device", or the like. The foldable display in the foldable screen device may be an integrated flexible display, may be a splicing display formed by a plurality of flexible displays and a horn chain between every two flexible displays, may be a splicing display formed by a plurality of rigid displays and a flexible display between every two rigid displays, may be a splicing display formed by a plurality of rigid displays and a horn chain between every two rigid displays, or the like. This is not limited in embodiments of this application.

(3) A layer is similar to a slide that includes elements such as texts or graphics. Layers are stacked in sequence one by one to form a final effect of a page. Different layers may be stacked to form an entire image and displayed on a page. Each layer includes many pixels and can be edited or modified separately. The layer may accurately locate elements on a page. Content such as texts, images, tables, and plug-ins may be added to a layer, or a layer may be embedded in a layer.

It should be understood that, in embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between associated objects. "At least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

A wallpaper is a background displayed on a display of the electronic device. FIG. 1*a* is a schematic diagram of a method for setting a wallpaper by a single-screen electronic device. An Android native wallpaper service framework supports setting of a theme and the wallpaper for the single-screen electronic device. As shown in FIG. 1*a*, the electronic device may generate, based on a wallpaper manager (WPM) service in the Android native wallpaper service framework, a service instance for setting the theme and the wallpaper, and then execute the service instance by using an engine instance, to implement theme wallpaper setting.

It should be noted that the single-screen electronic device in this application is an electronic device having a single display (e.g., a physical display), and the multi-screen electronic device in this application is an electronic device having a plurality of displays (e.g., physical displays). The multi-screen electronic device has a primary screen (also referred to as an interior screen) and a secondary screen (also referred to as an exterior screen). It may be considered that the display of the single-screen electronic device is equivalent to the primary screen of the multi-screen electronic device, and the multi-screen electronic device has an additional secondary screen compared with the single-screen electronic device.

Figure 1B:
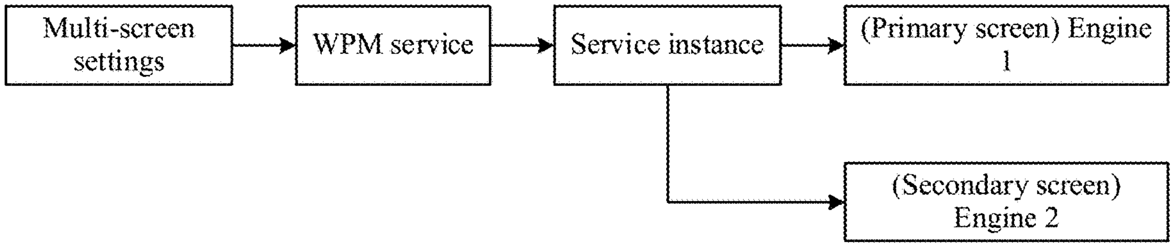
FIG. 1*b* is a schematic diagram of a method for setting a wallpaper by a multi-screen electronic device.

FIG. 1*b* is a schematic diagram of a method for setting a wallpaper by a multi-screen electronic device. Compared with an Android native wallpaper service framework, a new Android wallpaper service framework provides a multi-screen theme wallpaper setting function. As shown in FIG. 1*b*, a service instance for setting theme wallpapers may be used to separately configure wallpapers of a primary screen and a secondary screen of the multi-screen electronic device, and then two engine instances are used to separately generate the wallpapers of the primary screen and the secondary screen for display, so that theme wallpapers of a plurality of displays can be set. In this manner, wallpaper display manners of the primary screen and the secondary screen are matched. Therefore, the wallpapers cannot be separately set for the primary screen and the secondary screen. In addition, wallpaper configuration resources of the primary screen and the secondary screen are predefined by the Android wallpaper service framework. If the wallpaper configuration resources need to be changed, the entire wallpaper configuration resources need to be replaced. Therefore, a processing process of changing a wallpaper is complex, and efficiency is low.

Figure 1C:
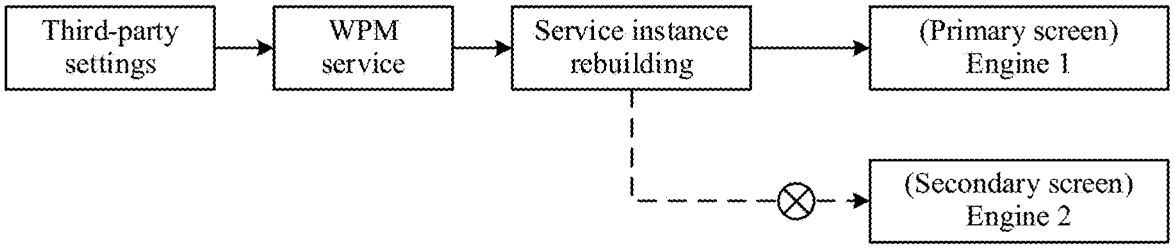
FIG. 1*c* is a schematic diagram of setting a wallpaper of a multi-screen electronic device by using a third-party application.

FIG. 1*c* is a schematic diagram of setting a wallpaper of a multi-screen electronic device by using a third-party application. As shown in FIG. 1*c*, when the third-party application sets a theme and a wallpaper by using a new Android wallpaper service framework, a service instance needs to be rebuilt. However, after the service instance is rebuilt, if the third-party application does not have multi-screen processing logic, only an engine instance for generating a theme and a wallpaper of a primary screen can be correctly executed, and an engine instance for generating a theme and a wallpaper of a secondary screen cannot be correctly executed. As a result, no wallpaper can be displayed or a wallpaper the same as that of the primary screen is displayed. Therefore, when the third-party application sets and changes a wallpaper, it is difficult to ensure a display effect of the wallpaper and implement separate wallpaper setting between the primary screen and the secondary screen.

Figure 1D:
FIG. 1*d* is a schematic diagram of another method for setting a wallpaper by a multi-screen electronic device.

FIG. 1*d* is a schematic diagram of another method for setting a wallpaper by a multi-screen electronic device. In the method, the multi-screen electronic device may treat a primary screen and a secondary screen as one screen having different display sizes for processing. In this case, the multi-screen electronic device may set wallpapers of the primary screen and the secondary screen in combination with a manner of setting a wallpaper by a single-screen electronic device. As shown in FIG. 1*d*, the wallpapers of the primary screen and the secondary screen may be generated by using an engine instance. The engine instance may be used to replace a wallpaper picture based on a size parameter of a display (for example, an aspect ratio of the display). In a state of using the primary screen, the engine instance is used to replace, based on a size of the primary screen, an original wallpaper with a wallpaper that adapts to the size of the primary screen, and display the wallpaper on the primary screen. In a state of using the secondary screen, the engine instance is used to replace, based on a size of the secondary screen, an original wallpaper with a wallpaper that adapts to the size of the secondary screen, and display the wallpaper on the secondary screen.

For example, as shown in FIG. 1*e*-1 to FIG. 1*e*-3, a single-screen electronic device is a bar phone, and a multi-screen electronic device is a foldable screen phone. An original wallpaper picture is a wallpaper picture of the bar phone. A primary screen of the foldable screen phone is a display of the foldable screen phone in an expanded state, and a secondary screen of the foldable screen phone is a display of the foldable screen phone in a folded state. Based on the foregoing method, when the wallpaper picture of the bar phone is set as a wallpaper of the foldable screen phone, a wallpaper displayed on the secondary screen is consistent with the original wallpaper picture, but a wallpaper displayed on the primary screen is stretched relative to the original wallpaper picture. This results in deformation of the wallpaper picture and greatly reduces user experience. In addition, in this method, because there is only one engine instance, the primary screen and the secondary screen cannot display the wallpaper at the same time.

In conclusion, in a current method for setting a wallpaper by an electronic device, both a single-screen electronic device and a multi-screen electronic device implement wallpaper setting based on a wallpaper service. Although the multi-screen electronic device may draw and generate wallpapers of different displays by establishing different engines, wallpaper setting of a primary screen and a secondary screen of the multi-screen electronic device still depends on a same WPN service. Therefore, a requirement for separately setting wallpapers for the primary screen and the secondary screen cannot be supported, resulting in poor flexibility and use experience of displaying wallpapers by the multi-screen electronic device.

In view of this, embodiments of this application provide a wallpaper display method and an electronic device. In the method, a plurality of wallpaper management services may be provided by using a service framework in an Android system of the electronic device. Each wallpaper management service is used to manage a wallpaper of only one display of the electronic device, and different wallpaper management services separately manage different displays. In this way, different wallpaper management services are independent of each other and do not affect each other. When a wallpaper of one display is updated and set, a wallpaper displayed on another display and a corresponding wallpaper management service are not affected, so that wallpapers of the different displays can be separately displayed, and flexibility of displaying the wallpapers by the multi-screen electronic device is improved.

However, in the foregoing method, the native service architecture in the Android system of the electronic device needs to be changed, which is easily limited in an actual implementation process. For example, some third-party applications installed in the electronic device may not have permission to change the service architecture in the Android system. Therefore, it is difficult to ensure smooth implementation of the foregoing method.

In view of this, embodiments of this application further provide a wallpaper display method and an electronic device. The method may be applied to a multi-screen electronic device, to implement separate setting and display of wallpapers of different displays of the multi-screen electronic device, and improve flexibility of displaying the wallpapers by the multi-screen electronic device, so that a user can flexibly adjust a wallpaper displayed on each display of the multi-screen electronic device based on an actual requirement, so as to improve use experience.

Figures 1, 1E, 2:
FIG. 1*e*-1 to FIG. 1*e*-3 are a schematic diagram of wallpapers of displays of a multi-screen electronic device.

Refer to FIG. 2. The following describes a structure of an electronic device to which the method provided in an embodiment of this application is applicable.

As shown in FIG. 2, the electronic device 200 may include a processor 210, an external memory interface 220, an internal memory 221, a USB port 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a SIM card interface 295, and the like.

The sensor module 280 may include a gyroscope sensor, an acceleration sensor, an optical proximity sensor, a fingerprint sensor, a touch sensor, a temperature sensor, a pressure sensor, a distance sensor, a magnetic sensor, an ambient light sensor, a barometric pressure sensor, a bone conduction sensor, and the like.

It may be understood that the electronic device 200 shown in FIG. 2 is merely an example, and does not constitute a limitation on the electronic device. In addition, the electronic device may have more or fewer components than those shown in the figure, or may combine two or more components, or may have different component configurations. Components shown in FIG. 2 may be implemented by hardware that includes one or more signal processing and/or application-specific integrated circuits, software, or a combination of hardware and software.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The controller may be a nerve center and a command center of the electronic device 200. The controller may generate an operation control signal based on an instruction operation code and a time sequence signal, to complete control of instruction reading and instruction execution.

A memory may be further disposed in the processor 210, and is configured to store instructions and data. In some embodiments, the memory in the processor 210 is a cache memory. The memory may store instructions or data just used or cyclically used by the processor 210. If the processor 210 needs to use the instructions or the data again, the processor may directly invoke the instructions or the data from the memory. This avoids repeated access, reduces waiting time of the processor 210, and improves system efficiency.

Execution of the wallpaper display method provided in embodiments of this application may be controlled by the processor 210 or completed by invoking another component, for example, invoking a processing program in this embodiment of this application stored in the internal memory 221, or invoking, by using the external memory interface 220, a processing program in this embodiment of this application stored in a third-party device, to control the wireless communication module 260 to perform data communication with another device, to implement intelligence and convenience of the electronic device 200, and improve user experience. The processor 210 may include different components. For example, when a CPU and a GPU are integrated, the CPU and the GPU may cooperate to perform the wallpaper display method provided in embodiments of this application. For example, in the wallpaper display method, some algorithms are performed by the CPU, and the other algorithms are performed by the GPU, to obtain fast processing efficiency.

The display 294 is configured to display an image, a video, and the like. The display 294 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In this embodiment of this application, the electronic device 200 includes N displays 294, where N is a positive integer greater than 1. The display 294 may be configured to display information input by a user or information provided to a user, and various graphical user interfaces (GUIs). For example, the display 294 may display a photo, a video, a web page, a file, or the like.

In this embodiment of this application, the display 294 may be one integrated flexible display, or may be a spliced display including two rigid screens and one flexible screen located between the two rigid screens.

The camera 293 (which may be a front-facing camera or a rear-facing camera, or one camera may serve as either a front-facing camera or a rear-facing camera) is used to capture a static image or video. Generally, the camera 293 may include a photosensitive element such as a lens group and an image sensor. The lens group includes a plurality of lenses (e.g., convex lenses or concave lenses), and is configured to collect an optical signal reflected by a to-be-photographed object and transmit the collected optical signal to the image sensor. The image sensor generates an original image of the to-be-photographed object based on the optical signal.

The internal memory 221 may be configured to store computer-executable program code. The executable program code includes instructions. The processor 210 runs the instructions stored in the internal memory 221, to perform various function applications of the electronic device 200 and data processing. The internal memory 221 may include a program storage region and a data storage region. The program storage region may store an operating system, code of an application (for example, a function of displaying a wallpaper), or the like. The data storage region may store data created during use of the electronic device 200 or the like.

The internal memory 221 may further store one or more computer programs corresponding to algorithms of the wallpaper display method provided in embodiments of this application. The one or more computer programs are stored in the internal memory 221 and are configured to be executed by the one or more processors 210. The one or more computer programs include instructions, and the instructions may be used to perform the steps in the following embodiments.

In addition, the internal memory 221 may include a high-speed random access memory, or may include a non-volatile memory, for example, at least one magnetic disk storage device, a flash memory device, or a universal flash storage (UFS).

Certainly, algorithm code of the wallpaper display method provided in embodiments of this application may be further stored in an external memory. In this case, the processor 210 may run, by using the external memory interface 220, the algorithm code of the wallpaper display method stored in the external memory.

The sensor module 280 may include a gyroscope sensor, an acceleration sensor, an optical proximity sensor, a fingerprint sensor, a touch sensor, or the like.

The touch sensor is also referred to as a “touch panel”. The touch sensor may be disposed on the display 294, and the touch sensor and the display 294 constitute a touch display, which is also referred to as a “touchscreen”. The touch sensor is configured to detect a touch operation performed on or near the touch sensor. The touch sensor may transfer the detected touch operation to the application processor to determine a type of the touch event. The display 294 may provide a visual output related to the touch operation. In some other embodiments, the touch sensor may also be disposed on a surface of the electronic device 200 at a location different from that of the display 294.

For example, the display 294 of the electronic device 200 displays a home screen, and the home screen includes icons of a plurality of applications (for example, a camera application and a WeChat application). The user taps an icon of the camera application on the home screen by using the touch sensor, to trigger the processor 210 to start the camera application and turn on the camera 293. The display 294 displays an interface of the camera application, for example, a viewfinder interface.

A wireless communication function of the electronic device 200 may be implemented through the antenna 1, the antenna 2, the mobile communication module 250, the wireless communication module 260, the modem processor, the baseband processor, and the like.

The antenna 1 and the antenna 2 are configured to transmit and receive an electromagnetic wave signal. Each antenna in the electronic device 200 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 250 may provide a wireless communication solution that includes 2G/3G/4G/5G or the like and that is applied to the electronic device 200. The mobile communication module 250 may include at least one filter, a switch, a power amplifier, a low noise amplifier (LNA), and the like. The mobile communication module 250 may receive an electromagnetic wave through the antenna 1, perform processing such as filtering or amplification on the received electromagnetic wave, and transmit the electromagnetic wave to the modem processor for demodulation. The mobile communication module 250 may further amplify a signal modulated by the modem processor, and convert the signal into an electromagnetic wave for radiation through the antenna 1. In some embodiments, at least some function modules in the mobile communication module 250 may be disposed in the processor 210. In some embodiments, at least some function modules of the mobile communication module 250 may be disposed in a same device as at least some modules of the processor 210. In this embodiment of this application, the mobile communication module 250 may be further configured to: exchange information with another device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio apparatus (which is not limited to the speaker 270A, the receiver 270B, or the like), or displays an image or a video by the display 294. In some embodiments, the modem processor may be an independent component. In some other embodiments, the modem processor may be independent of the processor 210, and is disposed in a same device as the mobile communication module 250 or another function module.

The wireless communication module 260 may provide a wireless communication solution that is applied to the electronic device 200 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 260 may be one or more components integrating at least one communication processor module. The wireless communication module 260 receives an electromagnetic wave through the antenna 2, performs frequency modulation and filtering processing on the electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation through the antenna 2. In this embodiment of this application, the wireless communication module 260 is configured to establish a connection to another electronic device, and exchange data. Alternatively, the wireless communication module 260 may be configured to access an access point device, send a control instruction to another electronic device, or receive data sent by another electronic device.

In addition, the electronic device 200 can implement an audio function such as music playing or recording through the audio module 270, the speaker 270A, the receiver 270B, the microphone 270C, the headset jack 270D, the application processor, and the like. The electronic device 200 may receive an input of the button 290, and generate a button signal input related to a user setting and function control of the electronic device 200. The electronic device 200 may generate a vibration prompt (for example, an incoming call vibration prompt) by using the motor 291. The indicator 292 in the electronic device 200 may be an indicator light that may be configured to indicate a charging state and a power change, and may be configured to indicate a message, a missed call, a notification, and the like. The SIM card interface 295 in the electronic device 200 is configured to connect to a SIM card. The SIM card may be inserted into the SIM card interface 295 or removed from the SIM card interface 295, to implement contact with or separation from the electronic device 200.

It should be understood that, in actual application, the electronic device 200 may include more or fewer components than those shown in FIG. 2. This is not limited in embodiments of this application. The electronic device 200 shown in the figure is merely an example, and the electronic device 200 may have more or fewer components than those shown in the figure, may combine two or more components, or may have different component configurations. Components shown in the figure may be implemented by hardware that includes one or more signal processing and/or application-specific integrated circuits, software, or a combination of hardware and software.

A software system of the electronic device 200 may use a layered architecture, an event-driven architecture, a microkernel architecture, a micro service architecture, or a cloud architecture. In embodiments of this application, a software structure of the electronic device is described by using an Android system with a layered architecture as an example.

Figures 1, 1E, 2, 3:
Figures 1, 1E, 2, 3:
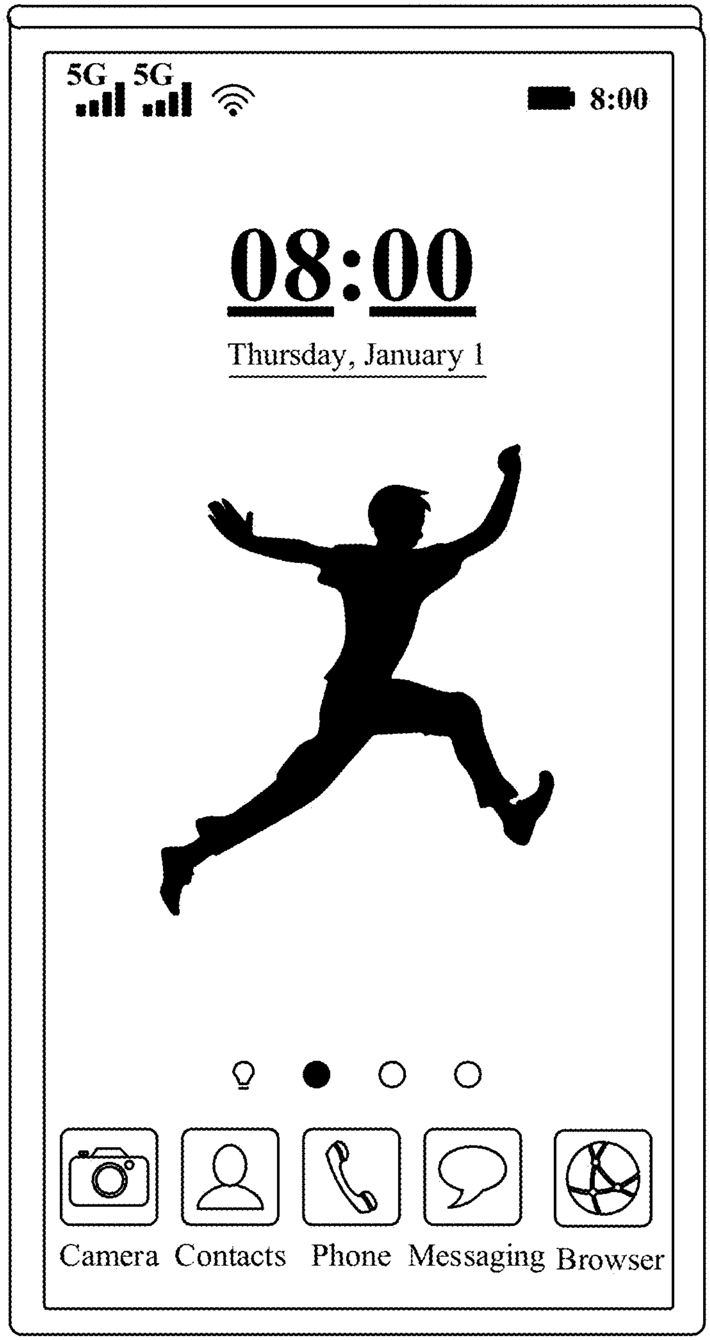
Figure 2:
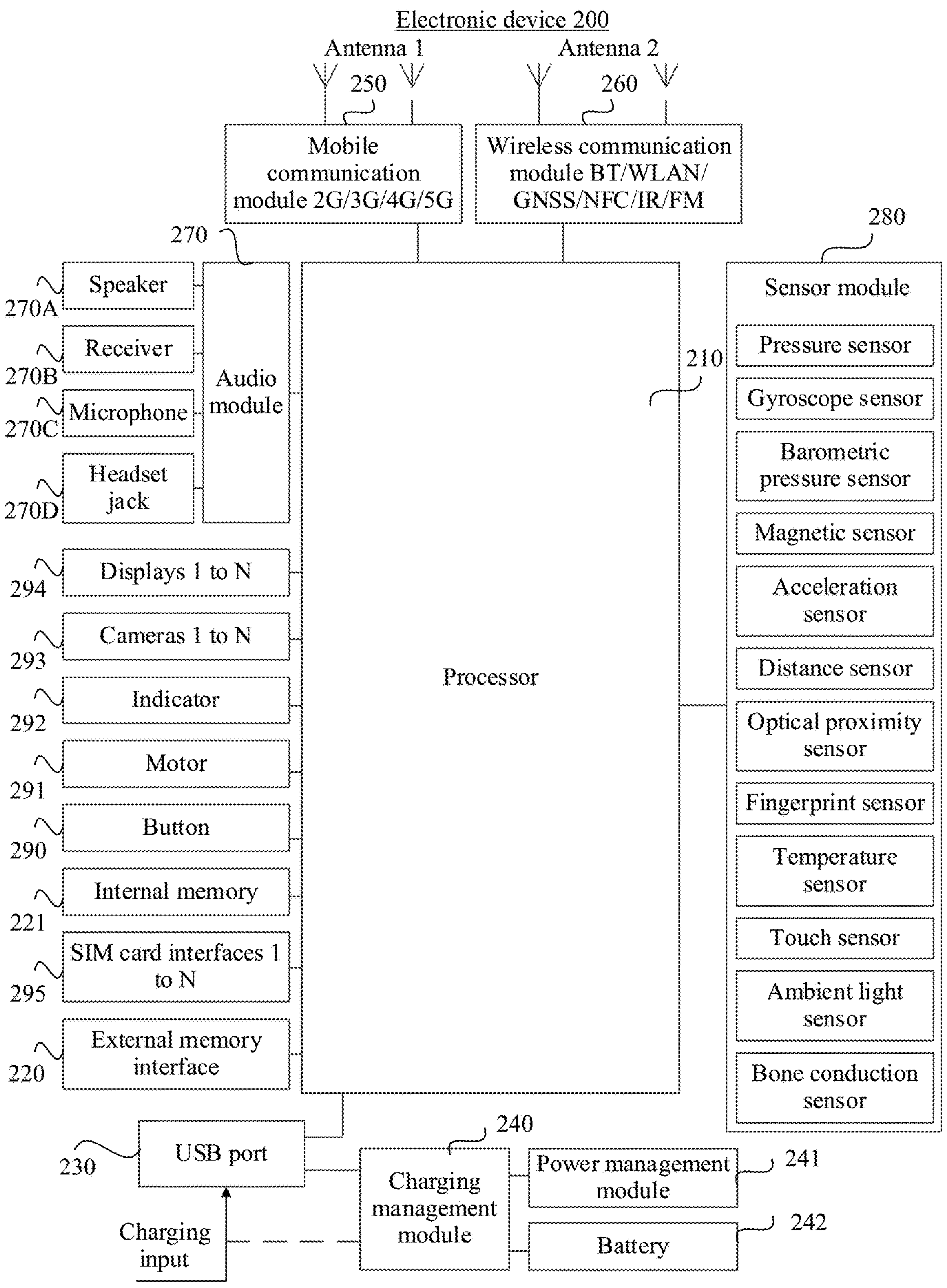
Figure 3:
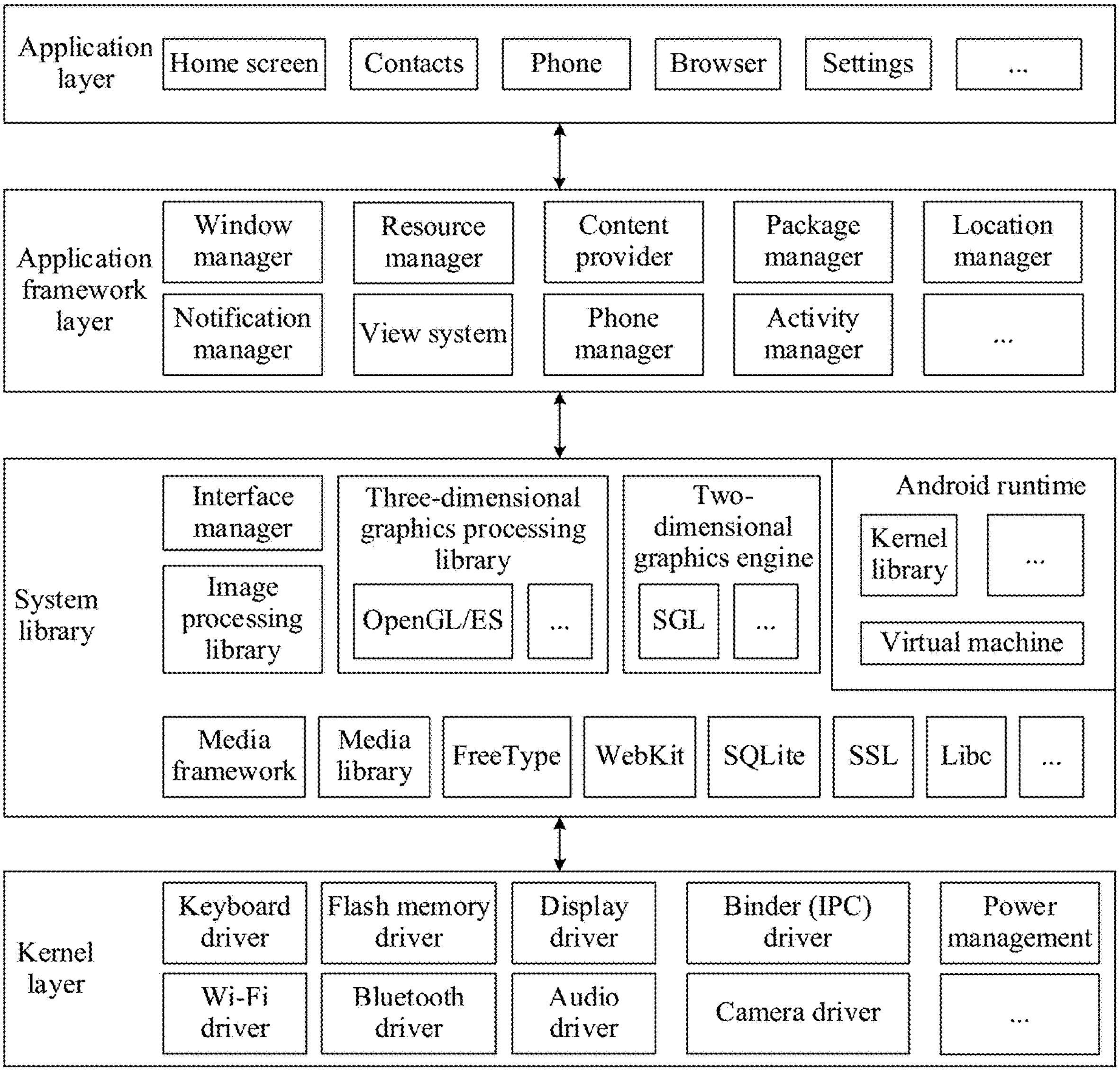

In the layered architecture, software is divided into several layers, and each layer has a clear role and task. The layers communicate with each other through a software interface. As shown in FIG. 3, the software architecture may be divided into four layers: an application layer, an application framework layer (FWK), an Android runtime and system library, and a Linux kernel layer from top to bottom.

The application layer is a top layer of the operating system, and includes native applications of the operating system, such as Home screen, Contacts, Phone, Browser, and Settings. An application in embodiments of this application is referred to as an application (APP) for short, and is a software program that can implement one or more specific functions. Usually, a plurality of applications, for example, a camera application, a mailbox application, or a video application, may be installed in the electronic device. An application mentioned below may be a system application installed when the electronic device is delivered from the factory, or may be a third-party application downloaded by the user from a network or obtained by the user from another electronic device during use of the electronic device.

Certainly, a developer may compile an application and install the application at the layer. In a possible implementation, the application may be developed by using a Java language, and is completed by invoking an application programming interface (API) provided by the application framework layer. The developer may interact with a bottom layer (for example, a kernel layer) of the operating system by using the application framework, to develop an application of the developer.

The application framework layer provides an application programming interface and a programming framework for an application at the application layer. The application framework layer may include some predefined functions. The application framework layer may include a window manager, a notification manager, a resource manager, a view system, a content provider, a phone manager, a package manager, an activity manager, a location manager, and the like.

The window manager is configured to manage a window program. The window manager may obtain a size of the display, determine whether there is a status bar, perform screen locking, take a screenshot, and the like. The notification manager enables an application to display notification information in a status bar, and may be configured to convey a notification message. The displayed notification information may automatically disappear after a short pause without requiring a user interaction. The resource manager provides access to non-code resources such as local strings, graphics, and layout files.

The view system includes a visual control, for example, s control that displays content such as a text, a picture, or a document. The view system may be configured to establish an application. An interface in a display window may include one or more views. For example, a display interface including an SMS message notification icon may include a view for displaying a text and a view for displaying an image.

The content provider is configured to: store and obtain data, and enable the data to be accessed by an application. The data may include information such as a file (for example, a document, a video, an image, or an audio), and a text. The phone manager is configured to provide a communication function of the electronic device.

The package manager is responsible for managing all programs in the Android system, for example, permission required for program installation or uninstallation, user data clearing, and cache clearing. The package manager allows the user to install, delete, upgrade, configure, and manage a software package on the operating system. The activity manager is configured to manage an application life cycle and provide a common navigation rollback function. The location manager provides a map management program to provide a navigation function for the user.

The Android runtime includes a kernel library and a virtual machine. The Android runtime is responsible for scheduling and management of the Android system.

The kernel library of the Android system includes two parts: one is a function that needs to be invoked in java language, and the other is the kernel library of the Android system. The application layer and the application framework layer run on the virtual machine. Java is used as an example. The virtual machine executes Java files of the application layer and the application framework layer as binary files. The virtual machine is configured to perform functions such as object lifecycle management, stack management, thread management, security and exception management, and garbage collection.

For example, the virtual machine may be a Dalvik virtual machine. In the Android system, each application is run in a process of the application, and has an independent Dalvik virtual machine instance. Therefore, the Dalvik virtual machine can enable the electronic device to simultaneously and efficiently run a plurality of virtual machines.

The system library may include a plurality of function modules, for example, an interface manager, an image processing library, a three-dimensional graphics processing library (for example, OpenGL ES), a two-dimensional graphics engine (for example, SGL), a media framework, a media library, a FreeType library, a web browser engine (WebKit), a relational database (SQLite), a secure sockets layer library (SSL), and a system function library (Libc).

The interface manager is configured to manage a display subsystem and provide fusion of a two-dimensional layer and a three-dimensional layer for a plurality of applications. The image processing library provides an image processing function. The three-dimensional graphics processing library is configured to implement three-dimensional graphics drawing, image rendering, composition, layer processing, and the like. The two-dimensional graphics engine is a drawing engine for two-dimensional drawing. The media library supports playback and recording in a plurality of commonly used audio and video formats, static image files, and the like. The media library may support a plurality of audio and video coding formats such as MPEG-4, H.564, MP3, AAC, AMR, JPG, and PNG. SQLite is a relational database developed for an embedded system, and may provide a lightweight relational database engine available for all applications. The FreeType library is an open-source, high-quality, and portable font engine that supports display of bitmap and vector fonts. WebKit provides a function of a web browser. The SSL provides security support for data communication. The Libc library is a function library on Linux, is also a bottom-layer library, and is implemented by invoking of a Linux system.

The kernel layer provides core system services of the operating system, such as security, memory management, process management, a network protocol stack, and a driver model, which are all implemented based on the kernel layer. The kernel layer is also used as an abstraction layer between hardware and software stacks. There are many drivers related to the electronic device at this layer. Main drivers include: a keyboard driver used as an input device, a Wi-Fi driver, a Bluetooth driver, a flash memory driver based on a memory technology device, a display driver, an audio driver, a camera driver, a Binder (IPC) driver, power management, and the like.

In some embodiments of this application, an application (for example, Settings) at the application layer has a capability of setting a wallpaper, and may set the wallpaper based on an operation of the user. The application framework layer has a file reading capability, and may read a resource package of the wallpaper based on the wallpaper set by the application at the application layer. The application framework layer further provides a multi-display management mechanism, and may separately provide rendering functions of different windows for displays, so as to generate a to-be-displayed wallpaper on the displays based on the resource package of the wallpaper. The system library may provide the resource package of the wallpaper. The driver at the kernel layer may process the displays, so as to present interfaces of different displays to an upper layer, and may display, on a corresponding display, the wallpaper generated by the application framework layer.

It should be understood that the foregoing function service is merely an example. In actual application, the electronic device may be divided into more or fewer function services based on another factor, or may be divided into functions of services in another manner, or may not be divided into function services, but work as a whole.

The following describes in detail the method provided in this application with reference to specific embodiments.

The solutions provided in embodiments of this application may be applied to an electronic device having a plurality of displays (e.g., physical displays). For example, the electronic device may be a foldable screen device. For ease of description, the following describes the solutions provided in embodiments of this application by using an example in which the solutions provided in embodiments of this application are applied to an electronic device having two displays. Optionally, in an embodiment of this application, an operating system of the electronic device may be an Android system.

In the embodiment of this application, the two displays of the electronic device are respectively a first display and a second display. Shapes and sizes of the first display and the second display may be the same or different, and one of the first display and the second display is a primary screen, and the other display is a secondary screen.

In a possible case, the two displays of the electronic device have a same shape, and may have a same size or different sizes. For example, as shown in FIG. 4*a*, both the first display and the second display of the electronic device are a rectangle, but a size of the first display is greater than a size of the second display.

In another possible case, the two displays of the electronic device have different shapes, and may have a same size or different sizes. For example, as shown in FIG. 4*b*, a shape of the first display of the electronic device is a rectangle, a shape of the second display is a circle, and the size of the first display is greater than the size of the second display.

The primary screen and the secondary screen of the electronic device may be obtained through division according to a preset rule. For example, the preset rule may be that a largest display is used as the primary screen, or a display with maximum use time and/or a maximum use frequency of a user is used as the primary screen, or a display of a preset shape is used as the primary screen. This is not specifically limited in embodiments of this application.

Figure 4A:
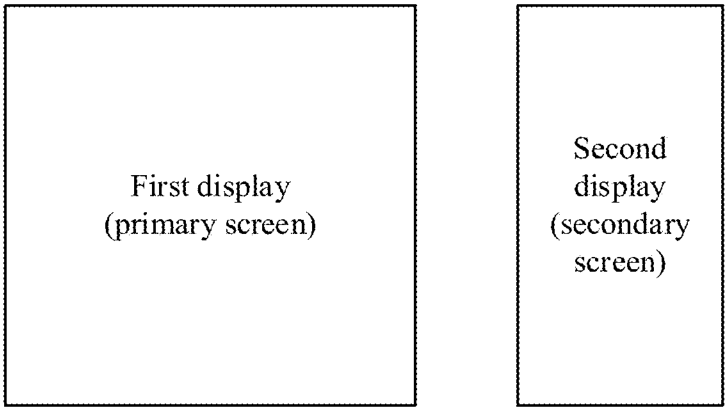
FIG. 4*a* is a schematic diagram of a possible display style of an electronic device according to an embodiment of this application.
Figure 4B:
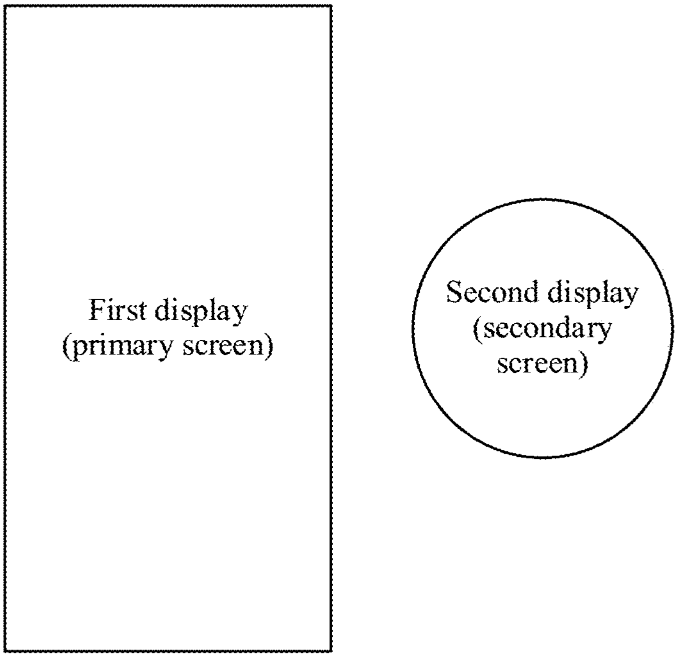
FIG. 4*b* is a schematic diagram of another possible display style of an electronic device according to an embodiment of this application.

For example, in the displays shown in FIG. 4*a* or FIG. 4*b*, the electronic device may use the first display as the primary screen, and use the second display as the secondary screen.

The following first describes a theme resource package of an electronic device in an embodiment of this application.

In the electronic device, a wallpaper of a display is included in a theme. The theme is personalized display content set by using an application, and the theme generally includes content such as a wallpaper (including a desktop wallpaper, a lock screen wallpaper, and the like), a font, an application icon, and an operation interface. After the electronic device applies a theme, a wallpaper displayed on the display of the electronic device is a wallpaper included in the theme. Certainly, the wallpaper may be modified based on a user operation, so as to implement personalized setting of a user for the wallpaper.

The setting for the theme is independent of management for the theme resource package. The theme resource package mainly includes related configuration information corresponding to a case in which the electronic device displays the wallpaper. The electronic device may set a corresponding theme based on the configuration information in the theme resource package. Therefore, before setting the theme, the electronic device needs to obtain the theme resource package first, so as to set the theme based on a configuration of the theme resource package. In embodiments of this application, each display of the electronic device has a corresponding theme resource package, and a wallpaper of each display is set and displayed based on configuration information of the theme resource package corresponding to the display. In embodiments of this application, theme resource packages of different displays may be managed separately, or may be managed together.

In an optional implementation, theme resource packages of a first display and a second display of the electronic device are respectively a first theme resource package and a second theme resource package, and the first theme resource package and the second theme resource package do not interfere with each other.

Figure 5:
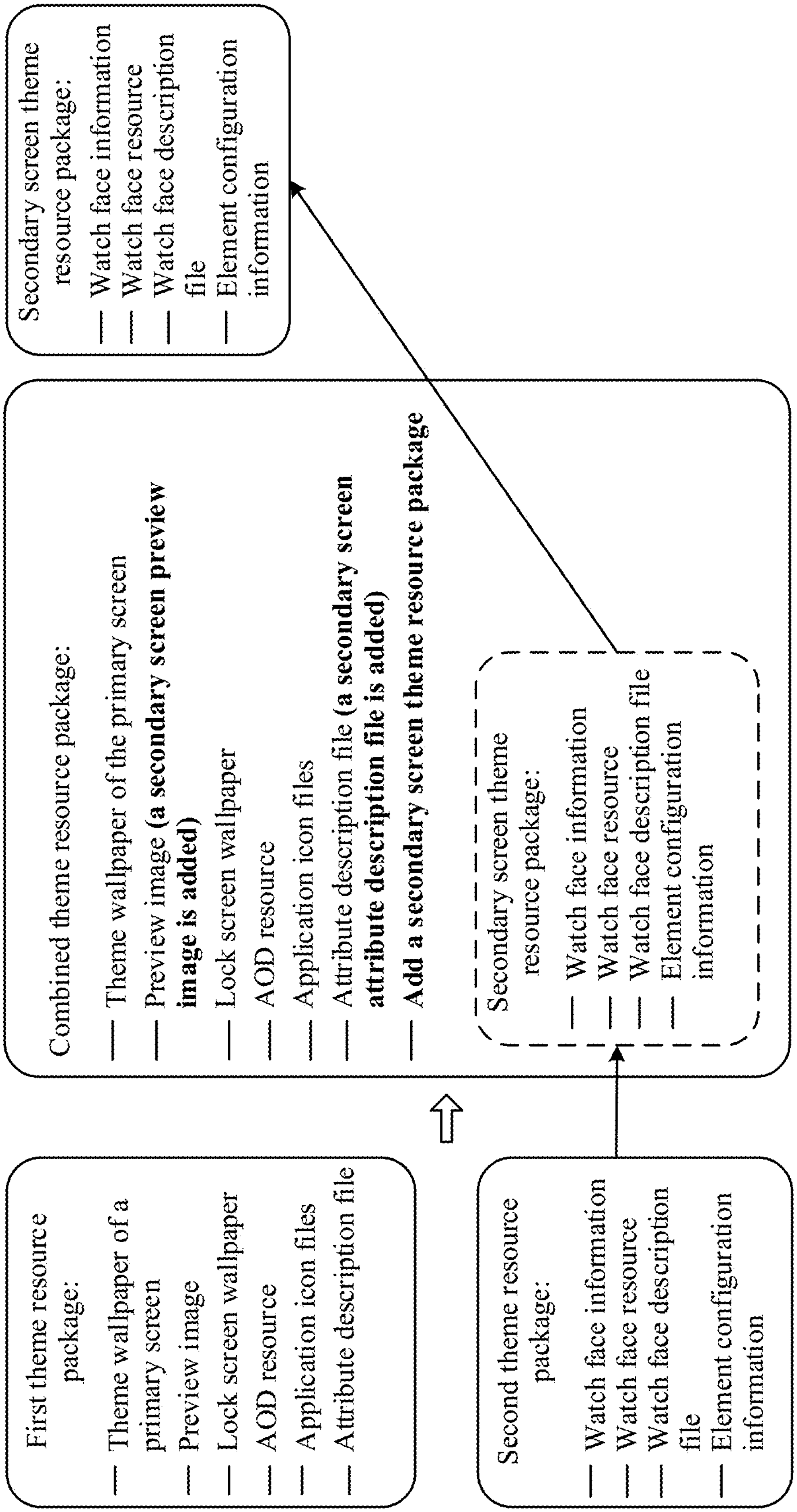
FIG. 5 is a schematic diagram of a theme resource package management method according to an embodiment of this application.

For example, as shown in FIG. 5, when the electronic device is a mobile phone having two displays, a first display of the mobile phone may be a display of a bar phone, a second display may be a circular watch face, the first display is a primary screen, and the second display is a secondary screen. In this case, the first theme resource package includes information such as a theme wallpaper, a preview image, a lock screen wallpaper, an always on display (AOD) resource, various application icon files, and an attribute description file of the primary screen. The second theme resource package includes information such as watch face information, a watch face resource, a watch face description file, and element configuration information. For example, after the electronic device displays a wallpaper of the second display based on the second theme resource package, if the wallpaper of the second display needs to be changed, the electronic device may first generate a theme resource package obtained after the wallpaper is replaced, then replace the second resource package with the theme resource package obtained after the wallpaper is replaced, and finally display a wallpaper of the second display based on the theme resource package obtained after replacement, so as to change the wallpaper of the second display. In this process, the electronic device does not perform an operation on the first theme resource package.

In another optional implementation, the first theme resource package and the second theme resource package may be integrated into one theme resource package, so that theme resources of a plurality of displays may be configured by using the one theme resource package.

For example, as shown in FIG. 5, the second theme resource package as a secondary screen theme resource package may be integrated into a theme resource package of the primary screen, namely, the first theme resource package, to obtain a combined theme resource package. In this case, the two resource packages may be managed in a unified manner. In addition to the second theme resource package, some additional configuration information such as a secondary screen preview image and an attribute description file of the secondary screen may be added to the combined resource package, and may be specifically added adaptively based on an actual situation. For example, when the electronic device needs to change a wallpaper displayed on the secondary screen, the electronic device may also replace the secondary screen theme resource package in the merged theme resource package with a corresponding secondary screen theme resource package obtained after the wallpaper is changed, so as to implement secondary screen wallpaper replacement.

Optionally, when theme settings of the two displays of the electronic device are associated, the theme resource packages of the two displays may be managed in a manner of combining the theme resource packages.

The following describes in detail a wallpaper display method provided in an embodiment of this application.

Figure 6:
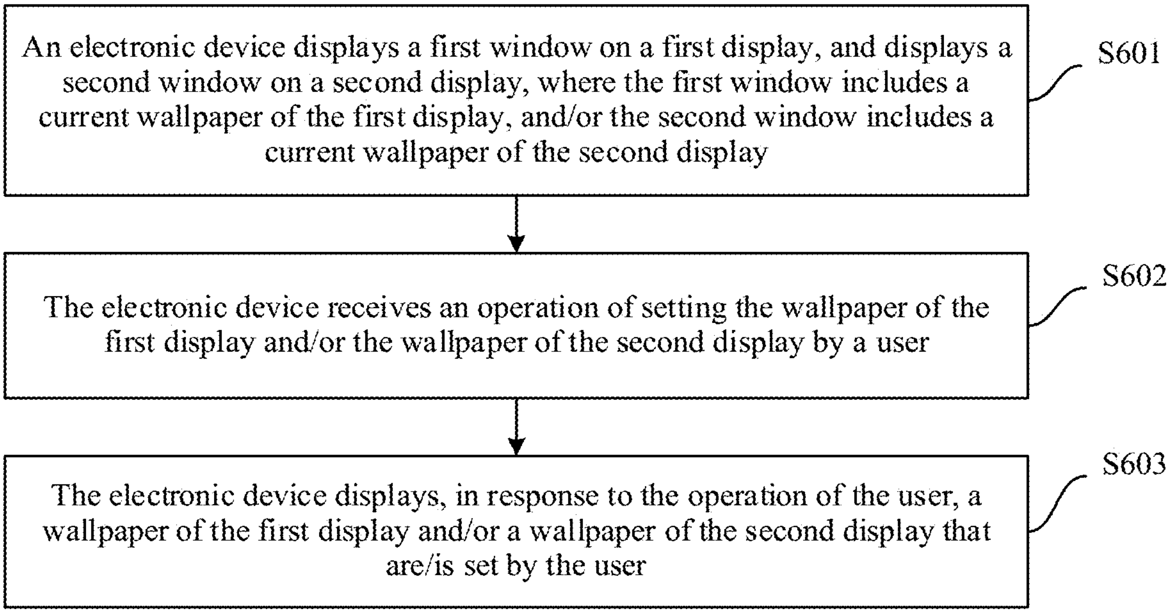
FIG. 6 is a schematic diagram of a wallpaper display method according to an embodiment of this application.

Refer to FIG. 6. The wallpaper display method provided in an embodiment of this application includes the following steps.

S601: An electronic device displays a first window on a first display, and displays a second window on a second display, where the first window includes a current wallpaper of the first display, and/or the second window includes a current wallpaper of the second display.

In the embodiment of this application, in the first display and the second display of the electronic device, one display may display a wallpaper, and the other display does not display a wallpaper; or two displays each may display a wallpaper. When the two displays each display a wallpaper, a wallpaper displayed on the first display and a wallpaper displayed on the second display may be the same or may be different.

In some embodiments of this application, the first window and the second window may be respectively used as wallpaper windows of the first display and the second display, an operating system of the electronic device may be an Android system, and a wallpaper service framework of the Android system provides a wallpaper management service. Therefore, the electronic device may display the first window and/or the second window by using the wallpaper management service, so as to display the wallpaper of the first display and/or the wallpaper of the second display. In view of this, the wallpaper in the first window and the wallpaper in the second window are generated by a native service (or an application) of the electronic device. Therefore, the wallpaper in the first window and the wallpaper in the second window may be referred to as native wallpapers, and a layer at which the wallpaper is located may be referred to as a native wallpaper layer.

In some embodiments of this application, after displaying the wallpaper of a first electronic device and a second electronic device, the electronic device may add an application layer to the layer at which the wallpaper is located, to display some content such as a control or a component icon that can be viewed or operated by a user, for example, content such as an application icon. The application layer covers the native wallpaper layer, and a region other than a region occupied by a control in the application layer is transparent, so that when the electronic device displays the control, content in the native wallpaper layer under the application layer may be displayed as a background (namely, the wallpaper).

Figure 7:
FIG. 7 is a schematic diagram of a native wallpaper of an electronic device according to an embodiment of this application.

For example, FIG. 7 is a schematic diagram of a native wallpaper of an electronic device according to an embodiment of this application. As shown in FIG. 7, the first display of the electronic device is a rectangular display, and the second display is a circular display. When setting a first picture as a wallpaper of a display of the electronic device, the electronic device may separately perform processing such as cropping and zooming on the first picture, to obtain a picture that can adapt to a size of the first display and a picture that can adapt to a size of the second display, and separately display, in the first window and the second window, the picture corresponding to the first display and the picture corresponding to the second display. On this basis, the electronic device may display application windows at layers above layers at which the first window and the second window are located, where the application windows include some content of a graphical user interface. For example, as shown in FIG. 7, in visual presentation, content such as the first picture used as the wallpaper, a status bar, time and weather widgets, and application icons is simultaneously displayed on the first display. Content such as the first picture used as the wallpaper, a time widget, a date widget, and a movement step quantity display widget is simultaneously displayed on the second display.

The wallpaper displayed on the first display and the wallpaper displayed on the second display may be automatically generated by the electronic device based on a specified theme, or may be generated based on a user instruction.

S602: The electronic device receives an operation of setting the wallpaper of the first display and/or the wallpaper of the second display by the user.

In the embodiment of this application, a wallpaper displayed on each display of the electronic device may be a picture, a video, an animation, or the like. The picture may be classified into a static picture, a dynamic picture, and the like. The static picture may be, for example, a picture in a format like a joint photographic expert group (JPEG/JPG) or portable network graphics (PNG). The dynamic picture may be, for example, a picture (namely, a motion picture) in a graphics interchange format (GIF). The video may be, for example, a video in a format like a moving picture experts group (MP4). The video may or may not include audio. The animation may be, for example, a frame animation formed by a plurality of pictures.

In the embodiment of this application, the electronic device supports the user in separately setting and updating wallpapers of different displays. Because a wallpaper is generally included in a theme, the electronic device may replace a wallpaper in a currently used theme, so that only the wallpaper is updated for setting, so as to meet a requirement of the user for separately setting a wallpaper.

Specifically, the electronic device may provide a wallpaper setting entrance for the user, so that the user can control a wallpaper display manner by performing an operation by using the wallpaper setting entrance. In some embodiments of this application, the electronic device may configure the wallpaper setting entrance in at least one of the following Manner 1 and Manner 2.

Manner 1: The electronic device may add a wallpaper setting entrance to a system-native application.

Figure 8A:
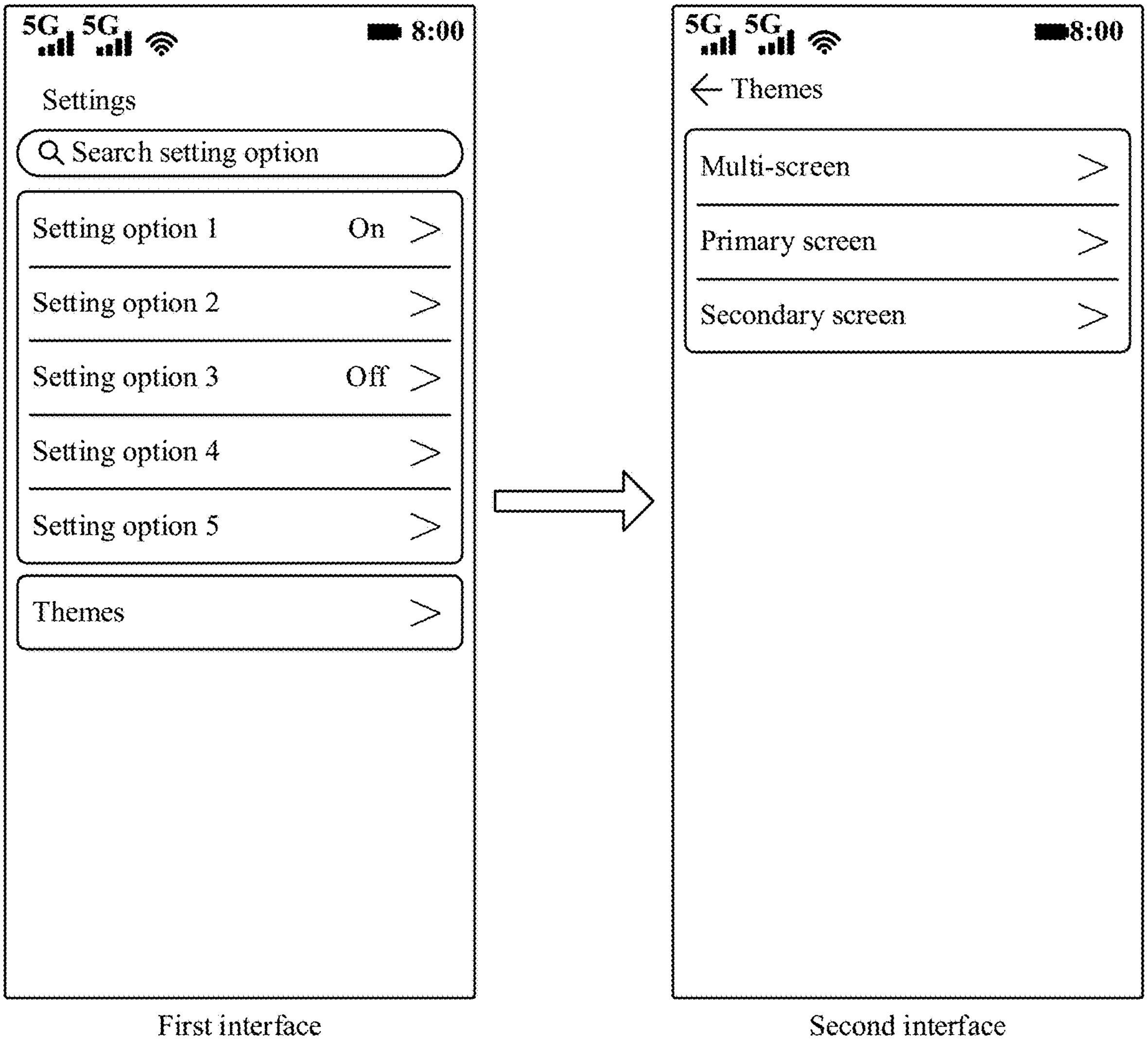
FIG. 8*a* is a schematic diagram of a wallpaper setting entrance of an electronic device according to an embodiment of this application.

For example, as shown in FIG. 8*a*, the electronic device adds an operation option of "Theme settings" to a main interface of a native application like Settings, and displays an operation option of "primary screen/secondary screen" on a secondary interface of "Theme settings". The main interface of Settings is an interface displayed after the user taps the set application icon displayed by the electronic device.

In this case, when the user needs to set a wallpaper of a display of the electronic device, the user may first enable Settings, and the electronic device displays, in response to the operation of enabling Settings by the user, a first interface shown in FIG. 8*a*. Then, the user selects an operation option of "Theme" from setting options on the first interface. The electronic device further displays, in response to the operation of the user, a second interface (namely, a secondary interface of "Theme") shown in FIG. 8*a*. The second interface includes operation options such as "Multi-screen", "Primary screen", and "Secondary screen". If the user needs to set wallpapers of a plurality of displays (namely, the primary screen and the secondary screen), the user may select an option of "Multi-screen" for setting, or may separately select an option of "Primary screen" and an option of "Secondary screen" for setting. If the user needs to separately set a wallpaper of the primary screen, the user may select the option of "Primary screen". If the user needs to separately set a wallpaper of the secondary screen, the user may select the option of "Secondary screen". In view of this, the user may not only control the wallpapers of the displays in a unified manner, but also separately control the wallpaper of the primary screen or the secondary screen.

After selecting the option of "Multi-screen", the user may further select a picture as a wallpaper of the display. After the selection ends, the electronic device starts, in response to the selection of the user, a process of setting the picture selected by the user as a wallpaper of each display. After selecting the option of "Primary screen", the user may further select a picture as the wallpaper of the primary screen. After the selection ends, the electronic device starts, in response to the selection of the user, a process of setting the picture selected by the user as the wallpaper of the primary screen. After selecting the option of "Secondary screen", the user may further select a picture as the wallpaper of the secondary screen. After the selection ends, the electronic device starts, in response to the selection of the user, a process of setting the picture selected by the user as the wallpaper of the secondary screen.

Figure 8B:
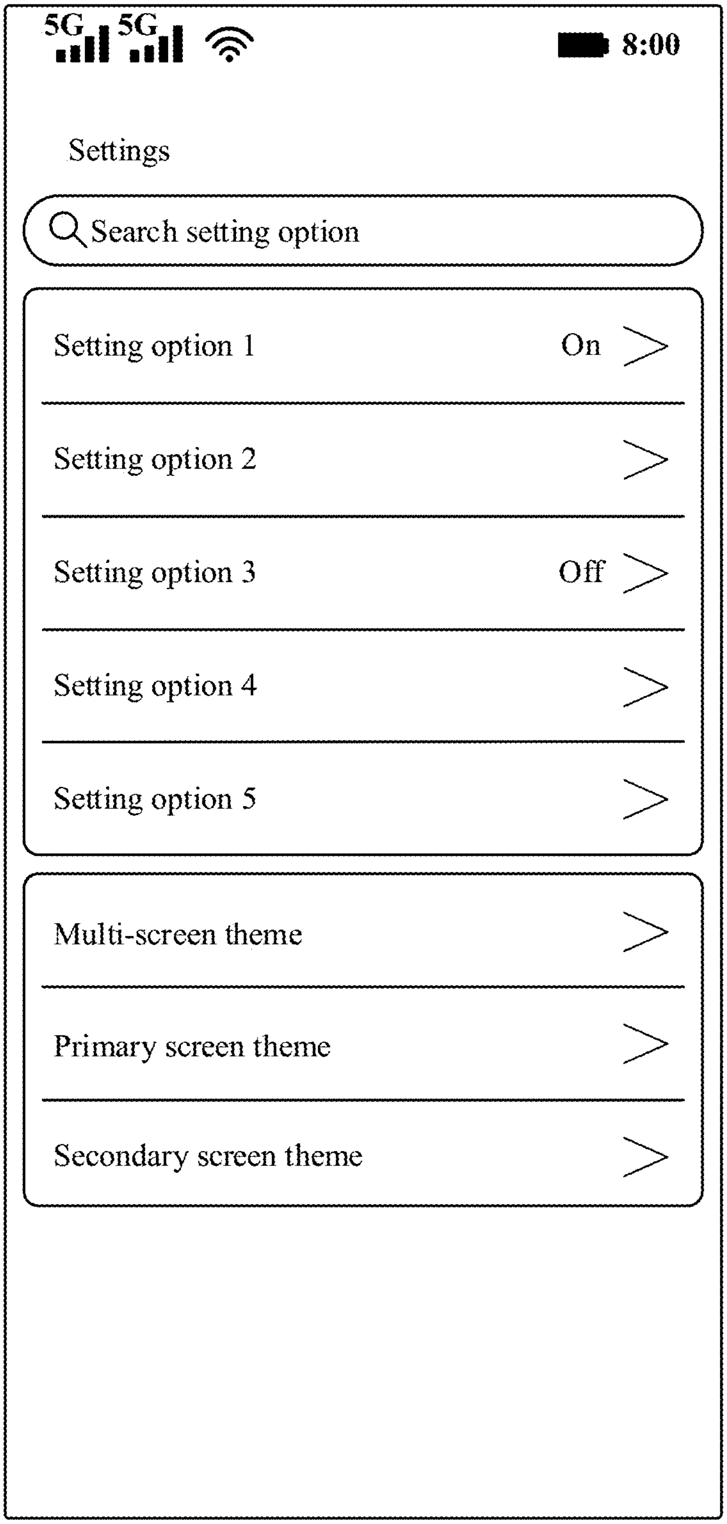
FIG. 8*b* is a schematic diagram of another wallpaper setting entrance of an electronic device according to an embodiment of this application.

For another example, as shown in FIG. 8*b*, alternatively, the electronic device may directly separately display operation options of "Multi-screen theme", "Primary screen theme", and "Secondary screen theme" on the main interface of Settings. In this case, the user may directly select a display for which a wallpaper needs to be set, thereby simplifying a user operation procedure.

Manner 2: The electronic device may display a wallpaper setting entrance on a wallpaper display interface in an application.

Figure 8C:
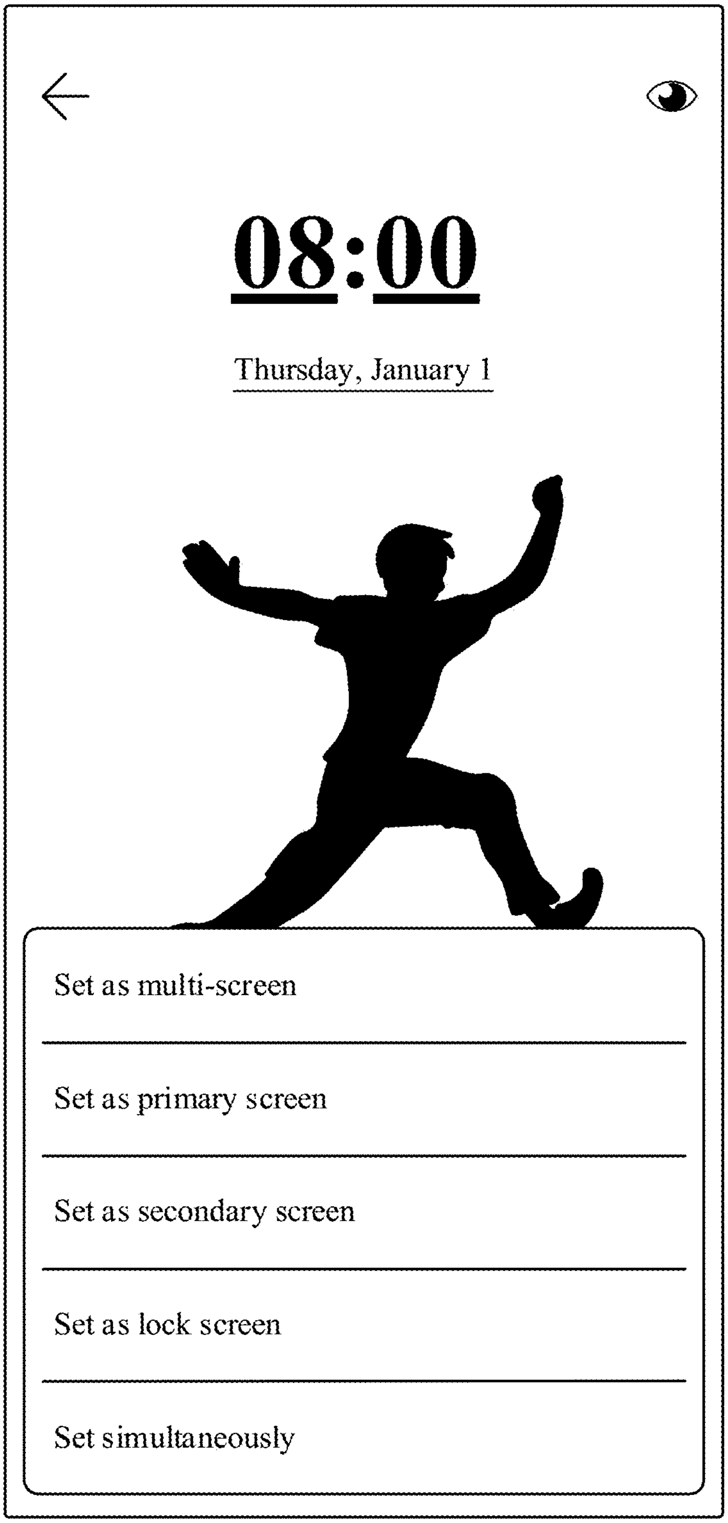
FIG. 8*c* is a schematic diagram of still another wallpaper setting entrance of an electronic device according to an embodiment of this application.

For example, in a process in which the user selects a picture in a Theme application or a Gallery application and previews the picture, the user may choose to set the picture as a wallpaper. In this case, the electronic device displays, in response to the operation of the user, a third interface shown in FIG. 8*c*. The third interface includes at least options of "Set to a multi-screen", "Set to a primary screen", and "Set to a secondary screen". The user may continue to select a corresponding option based on a requirement, to trigger the electronic device to start a process of setting the picture as a wallpaper of a corresponding display.

S603: The electronic device displays, in response to the operation of the user, the wallpaper of the first display and/or the wallpaper of the second display that are/is set by the user.

After receiving the user operation, if the electronic device determines that the operation is used to trigger setting of the wallpaper of the first display, the electronic device starts to perform a wallpaper setting procedure for the first display, to set a picture selected by the user as the wallpaper of the first display; or if the electronic device determines that the operation is used to trigger setting of the wallpaper of the second display, the electronic device starts to perform a wallpaper setting procedure for the first display, to set a picture selected by the user as the wallpaper of the second display; if the electronic device determines that the operation is used to trigger setting of wallpapers of all displays, the electronic device starts to perform a wallpaper setting procedure for all the displays, to set a picture selected by the user as the wallpapers of all the displays.

The wallpaper setting procedure for the first display is similar to the wallpaper setting procedure for the second display. Therefore, the following describes only the wallpaper setting procedure for the second display performed by the electronic device in detail. For a method for performing the wallpaper setting procedure for the first display by the electronic device, refer to a method for performing the wallpaper setting procedure of the second display by the electronic device. Details are not described below.

When the electronic device receives an operation of setting first target content as the wallpaper of the second display by the user, if the first display and the second display currently each have one window (namely, the first window and the second window) that displays a wallpaper, the electronic device continues to display a third window on the second display, and displays the first target content in the third window, so as to display the wallpaper set by the user. The third window covers the second window, and the first target content is content that is set by the user and that is used as the wallpaper of the second display.

When displaying the first target content in the third window, the electronic device may first obtain configuration information (for configuring the first target content as the wallpaper of the second display) corresponding to the first target content, and then generate, based on a configuration of the configuration information, the wallpaper adapted to the third window for display. After displaying the third window on the second display and displaying the first target content in the third window, the electronic device may continue to display a fourth window on the second display, and display, in the fourth window, third content that needs to be presented to the user. The fourth window covers the third window. The third content includes at least one element, and the element may be a control, a component, an icon, or the like. A region other than the at least one element in the fourth window is a non-transparent region.

Subsequently, when the user resets a wallpaper of the second display, the electronic device still displays, in the third window in a content update manner, the wallpaper set by the user. Specifically, when receiving an operation of setting second target content as a wallpaper of the second display by the user, the electronic device first obtains configuration information (for configuring the second target content as the wallpaper of the second display) corresponding to the second target content, replaces current configuration information, namely, the configuration information corresponding to the first target content, with the configuration information, and finally generates, based on the replaced configuration information, the wallpaper adapted to the third window for display.

In some embodiments of this application, the configuration information based on which the electronic device displays the wallpaper may be a theme resource package. When performing the wallpaper display procedure for the second display, the electronic device first obtains a corresponding theme resource package based on an image file that is set by the user and that is used as the wallpaper of the second display, then replaces, with a resource in the theme resource package, a resource file that is in the theme resource package currently used by the electronic device and that corresponds to the second display, and finally draws, based on a theme resource obtained after replacement, a corresponding wallpaper for display.

Figure 9:
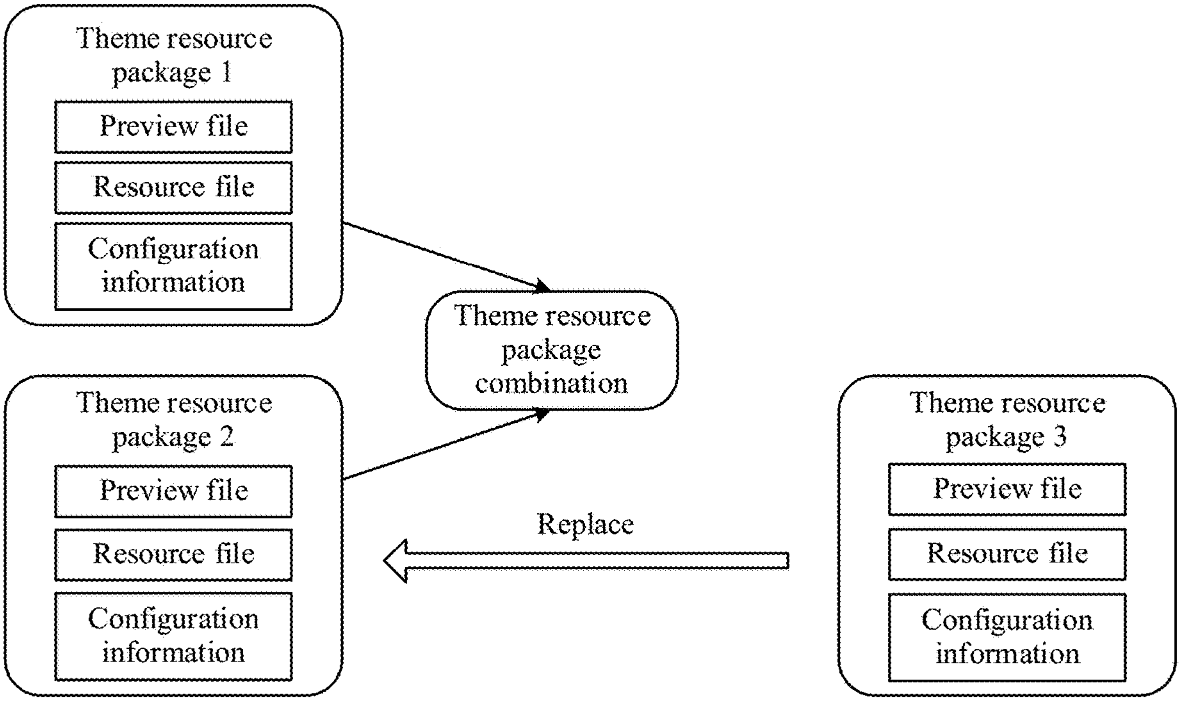
FIG. 9 is a schematic diagram of a theme resource package of an electronic device according to an embodiment of this application.

For example, as shown in FIG. 9, a theme resource package 1 is a resource package currently used by the first display of the electronic device, and a theme resource package 2 is a resource package currently used by the second display of the electronic device. The electronic device may separately manage the theme resource package 1 and the theme resource package 2, or may combine the theme resource package 1 and the theme resource package 2 into one theme resource package through theme resource package combination. A theme resource package 3 is a theme resource package corresponding to the wallpaper that is of the second display and that is set by the user. After obtaining the theme resource package 3, the electronic device replaces a resource in the theme resource package 2 with a resource in the theme resource package 3, to obtain an updated theme resource, that is, uses resources in the theme resource package 1 and the theme resource package 3 as updated theme resources, and the electronic device may draw, based on the updated theme resource, an updated wallpaper for display. The theme resource package 3 may be a resource released by a third-party application in the Theme application, or may be a resource generated by the electronic device.

Figure 10:
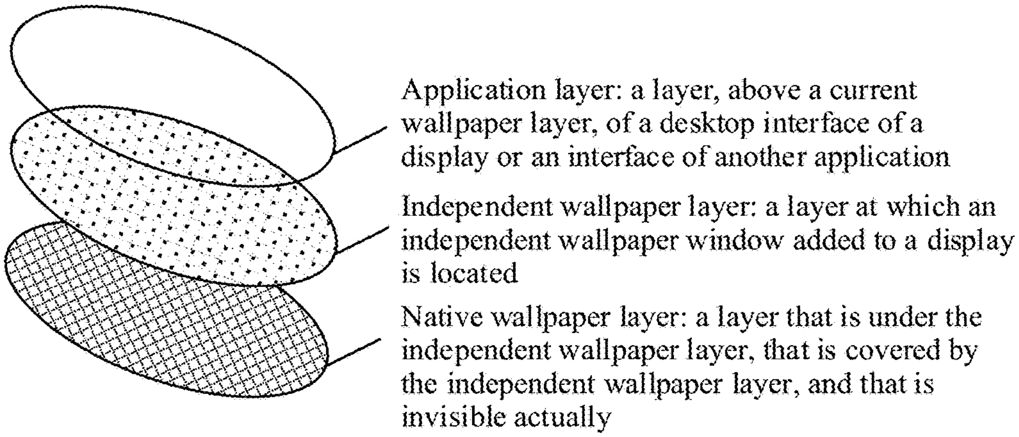
FIG. 10 is a schematic diagram of a display layer of an electronic device according to an embodiment of this application.

In some embodiments of this application, after the electronic device draws the wallpaper of the second display based on the replaced theme resource, when displaying the wallpaper, the electronic device adds an independent wallpaper layer (namely, a layer at which the third window is located) to the second display to display the wallpaper set by the user. As shown in FIG. 10, the independent wallpaper layer is located above the native wallpaper layer of the electronic device, and is located below the application layer of the electronic device. The electronic device may display a wallpaper window (namely, the third window) on the independent wallpaper layer, where content in the wallpaper window is a picture selected by the user as the wallpaper, and a size of the wallpaper window is greater than or equal to a size of the native wallpaper window (namely, the second window).

Optionally, the size of the wallpaper window displayed by the electronic device on the independent wallpaper layer is less than or equal to the size of the independent wallpaper layer, and the size of the independent wallpaper layer is greater than or equal to the size of the native wallpaper layer.

Figure 11:
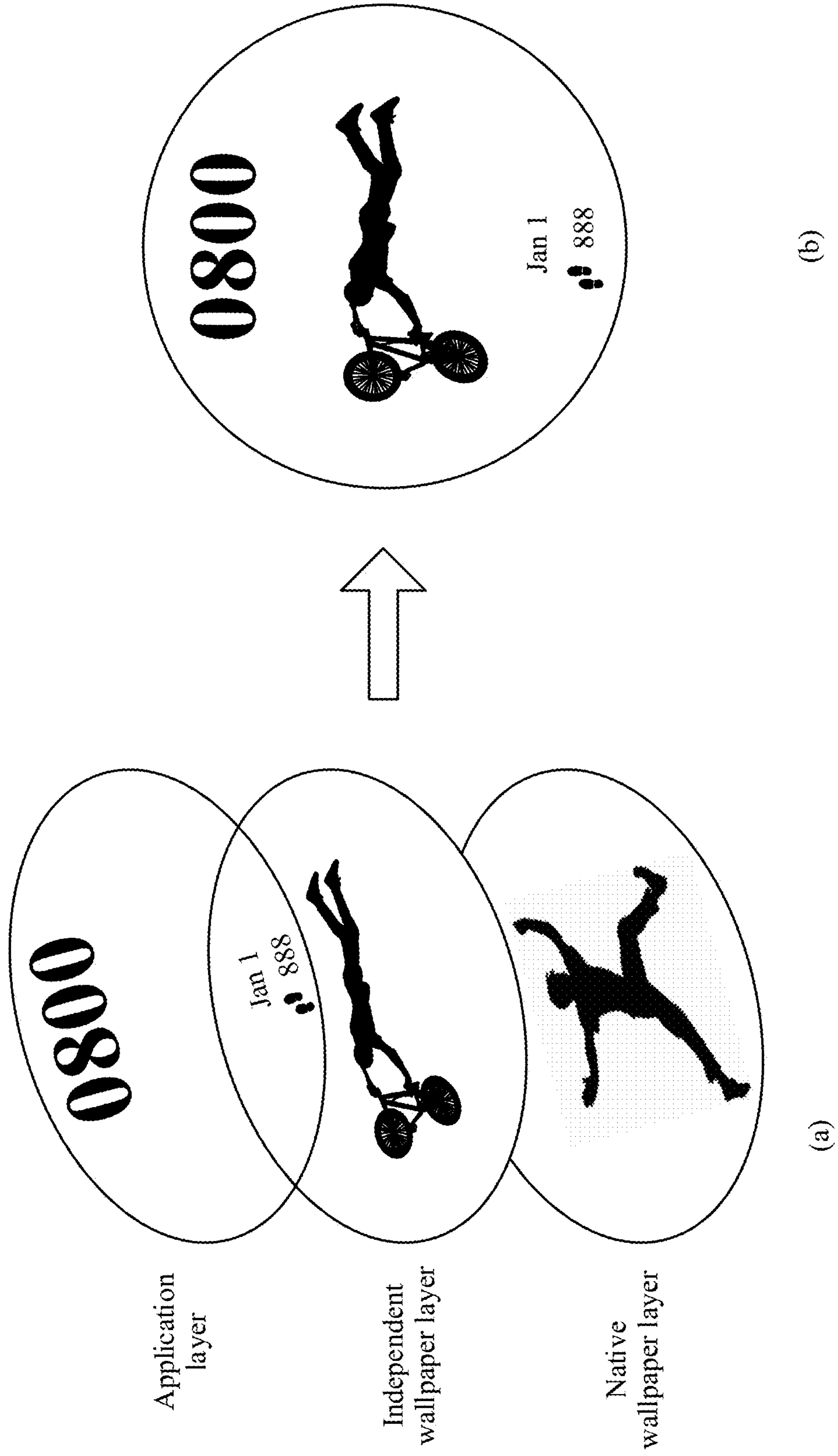
FIG. 11 is a schematic diagram of a wallpaper displayed by an electronic device at a display layer according to an embodiment of this application.

For example, as shown in a schematic diagram in (a) in FIG. 11, a wallpaper currently displayed on the second display is in the native wallpaper layer, a wallpaper that is set by the user and that is to be displayed on the second display is in the independent wallpaper layer, and a related component and a related icon on the desktop interface of the second display is in the application layer. When display is performed in this manner, content on the independent wallpaper layer covers content on the native wallpaper layer, so that the second display finally displays an effect shown in a schematic diagram in (b) in FIG. 11, so as to implement update of the wallpaper of the second display.

Figure 12:
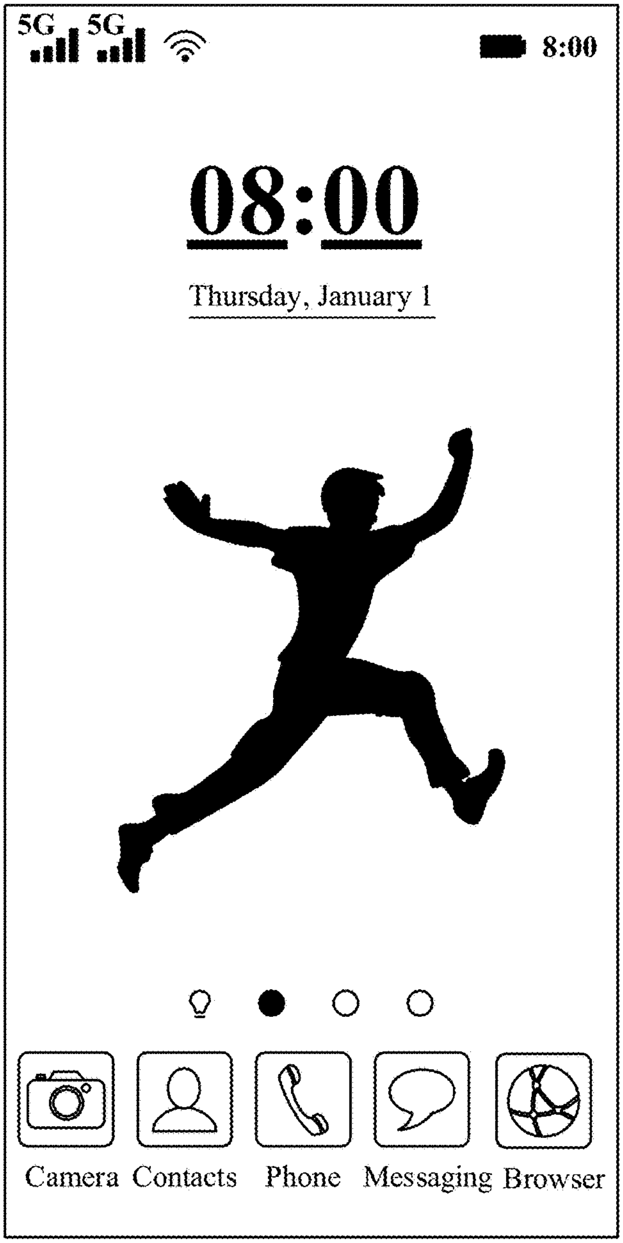
FIG. 12 is a schematic diagram of a wallpaper of an electronic device according to an embodiment of this application.
Figure 12:
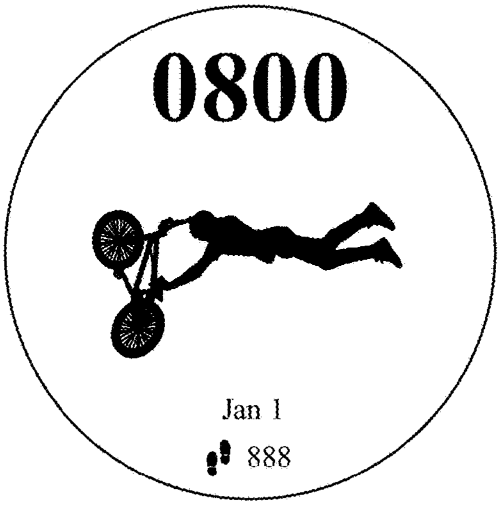
Figure 13:
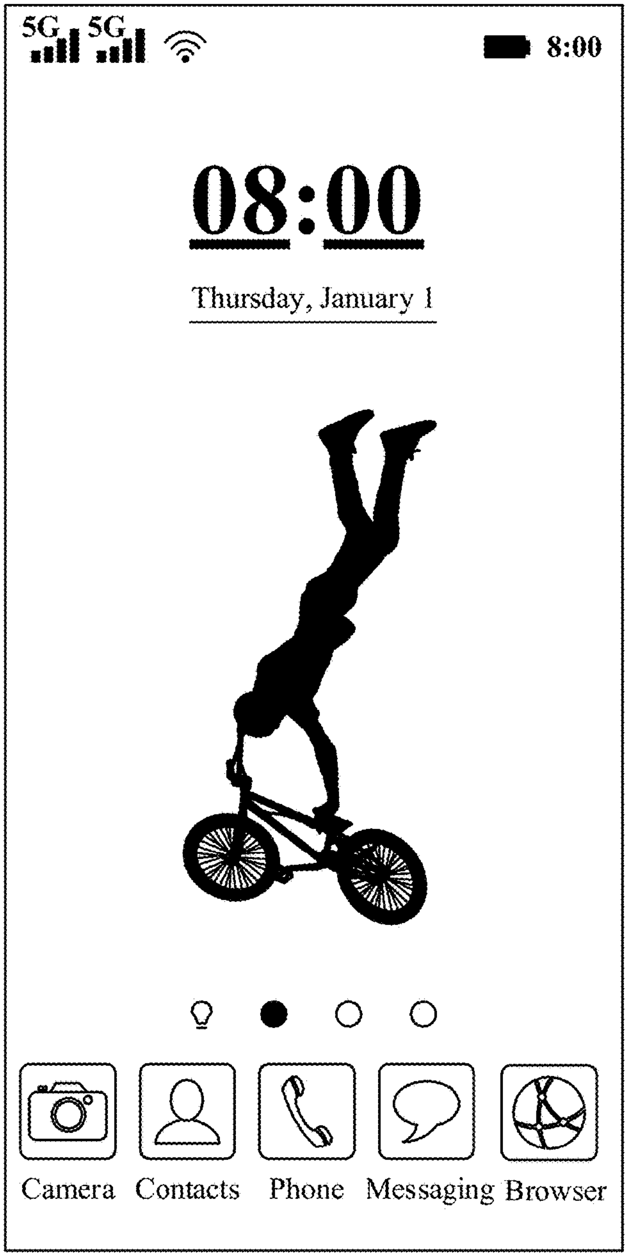
FIG. 13 is a schematic diagram of a wallpaper of an electronic device according to an embodiment of this application.
Figure 13:
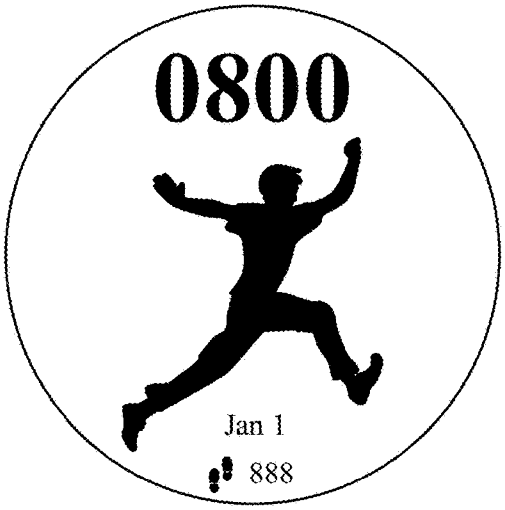

For example, based on display content of the electronic device shown in FIG. 7, after the electronic device updates the wallpaper of the second display in the foregoing manner, content displayed on the first display and content displayed on the second display are shown in FIG. 12. It can be learned from FIG. 7 that in this wallpaper setting process, only the wallpaper of the second display is updated, and the wallpaper of the first display is not changed. Therefore, separate control of the wallpaper of the second display is implemented. After the electronic device updates the wallpaper of the first display in the foregoing manner, content displayed on the first display and content displayed on the second display are shown in FIG. 13. Similarly, the electronic device may also implement separate control of the wallpaper of the first display.

Based on the foregoing method, the user may separately and flexibly control, based on a requirement, wallpaper displayed on each display of the electronic device, and a third-party application in the electronic device may also separately and flexibly control the wallpaper on each display, without being limited by a native system service of the electronic device.

In some embodiments of this application, there may be another layer or window above the independent wallpaper layer, for example, a layer of a window like a system prompt, a status bar, or a navigation bar. This is not specifically limited in embodiments of this application.

In some embodiments of this application, the wallpaper window (or the independent wallpaper layer) in the independent wallpaper layer may be in any one of the following formats:

Format 1: Non-Transparent Format

When the wallpaper window is in the non-transparent format, the independent wallpaper layer at which the wallpaper window is located covers all content in the native wallpaper layer, all the content displayed in the native wallpaper layer is invisible to the user, and only content of the independent wallpaper layer and the application layer is visible to the user, for example, a display effect of the second display shown in FIG. 12.

Format 2: Partial-Region Transparent Format

When the wallpaper window is in the partial-region transparent format, a region of the wallpaper window is divided into a transparent region and a non-transparent region. Content of the non-transparent region in the wallpaper window covers content of a corresponding region in the native wallpaper layer, and therefore, the content of the corresponding region in the native wallpaper layer is invisible to the user. Content of the transparent region in the wallpaper window does not cover content of a corresponding region in the native wallpaper layer, and therefore, the content of the corresponding region in the native wallpaper layer is visible to the user.

In some embodiments of this application, in an optional implementation, content displayed in the wallpaper window of the independent wallpaper layer (or the independent wallpaper layer) is different from content displayed in the native wallpaper layer.

For example, as shown in FIG. 12, the content in the independent wallpaper layer may be other newly obtained content. Because the content in the independent wallpaper layer is different from the content in the native wallpaper layer, the wallpaper displayed on the second display is a brand new wallpaper compared with that in FIG. 7.

As another optional implementation, a part of the content displayed in the wallpaper window in the independent wallpaper layer may come from the content in the native wallpaper layer.

Figure 14:
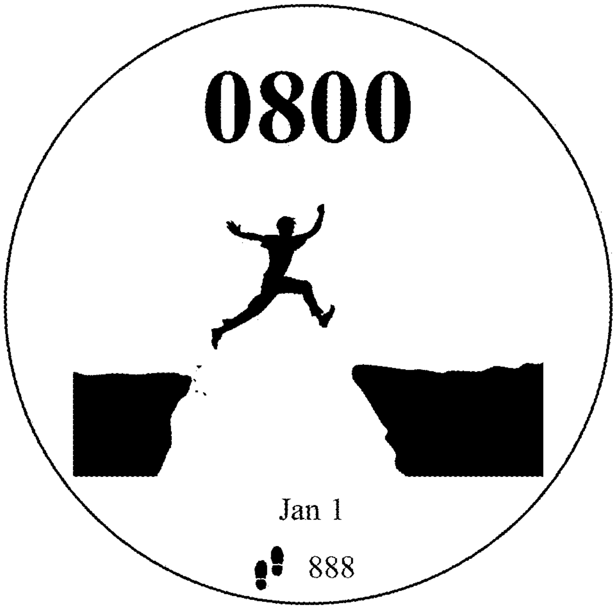
FIG. 14 is a schematic diagram of a wallpaper of an electronic device according to an embodiment of this application.

For example, the content that is similar to that in the native wallpaper layer and that is presented on the second display shown in FIG. 14 may be content displayed in a window of the independent wallpaper layer after content in the native wallpaper layer is copied, adjusted, such as being cropped and scaled, and then added to the window. In this case, the independent wallpaper layer is non-transparent, but may also display the part of content that is the same as that in the native wallpaper layer. In addition, in the independent wallpaper layer, in addition to displaying the copied part of content of the native wallpaper layer, other content may be further added. In this way, the wallpaper presented on the second display includes both the part of content in the native wallpaper layer and the newly added content.

Display of the independent wallpaper layer may be controlled by a service other than a native wallpaper management service in the Android system of the electronic device, for example, a service newly created by the electronic device, or a service created by a third-party application.

In some embodiments of this application, when performing a wallpaper setting procedure of all the displays, the electronic device may first obtain a theme resource package corresponding to a wallpaper that needs to be set by the user, then separately read, from the theme resource package, resource wallpapers suitable for the first display and the second display, then separately draw wallpapers of the first display and the second display based on the read resources, and finally display the wallpapers.

As an optional implementation, in the display process, the electronic device may display a wallpaper of one of the displays in a native wallpaper layer of the display, that is, replace a wallpaper currently displayed at the native wallpaper layer with the wallpaper that needs to be displayed on the display. The electronic device may add an independent wallpaper layer to a native wallpaper layer of the other display, and display, in the added independent wallpaper layer, a wallpaper that needs to be displayed. In this case, one display of the first display and the second display displays a wallpaper by using a native wallpaper layer, and the other display displays a wallpaper by using a newly added independent window.

In another optional implementation, the electronic device may add one independent wallpaper layer to a native wallpaper layer of each display, and display, in the added independent wallpaper layer, a wallpaper corresponding to the display.

In the foregoing embodiment, based on the method for adding a display layer and a display window, the electronic device may separately and independently control display of wallpapers on different displays without affecting a native wallpaper display system and without being affected by the native wallpaper display system. In this way, the wallpapers displayed on the different displays may be separately set and managed, and flexibility of displaying the wallpapers by the electronic device can be improved, so that the user can flexibly adjust, based on an actual requirement, the wallpapers displayed on the different displays of the electronic device, so as to improve use experience.

The following describes the method provided in embodiments of this application with reference to a specific instance.

In this instance, an example in which a first display is a regular display and a second display is an irregular display is used for description. The regular display is a display of a regular shape, for example, a rectangular display, and the irregular display is a display of an irregular shape, for example, a circular display or an elliptical display. The regular shape may be a preset shape.

Figure 15A:
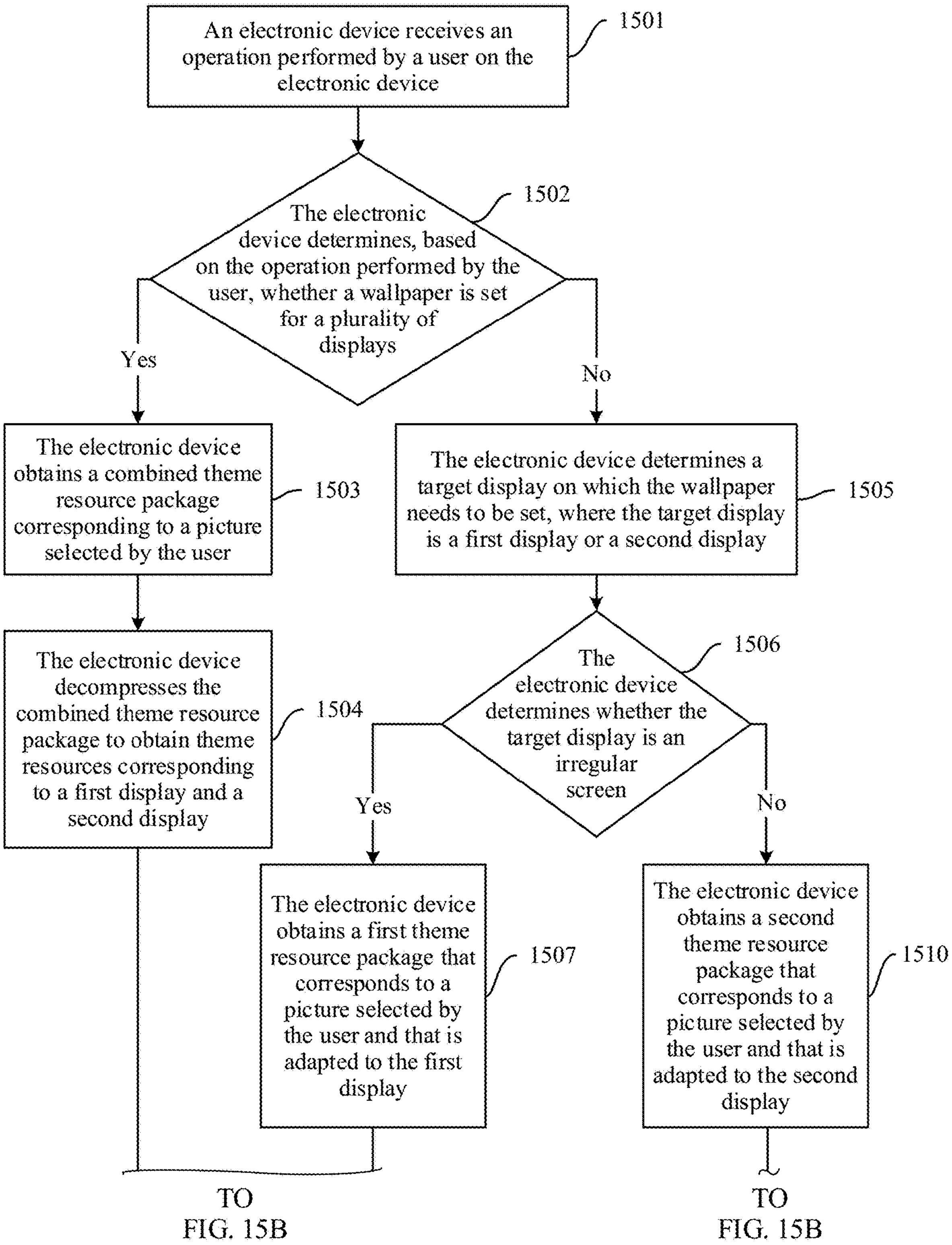
FIG. 15A and FIG. 15B are a schematic flowchart of a wallpaper display method according to an embodiment of this application.
Figure 15B:
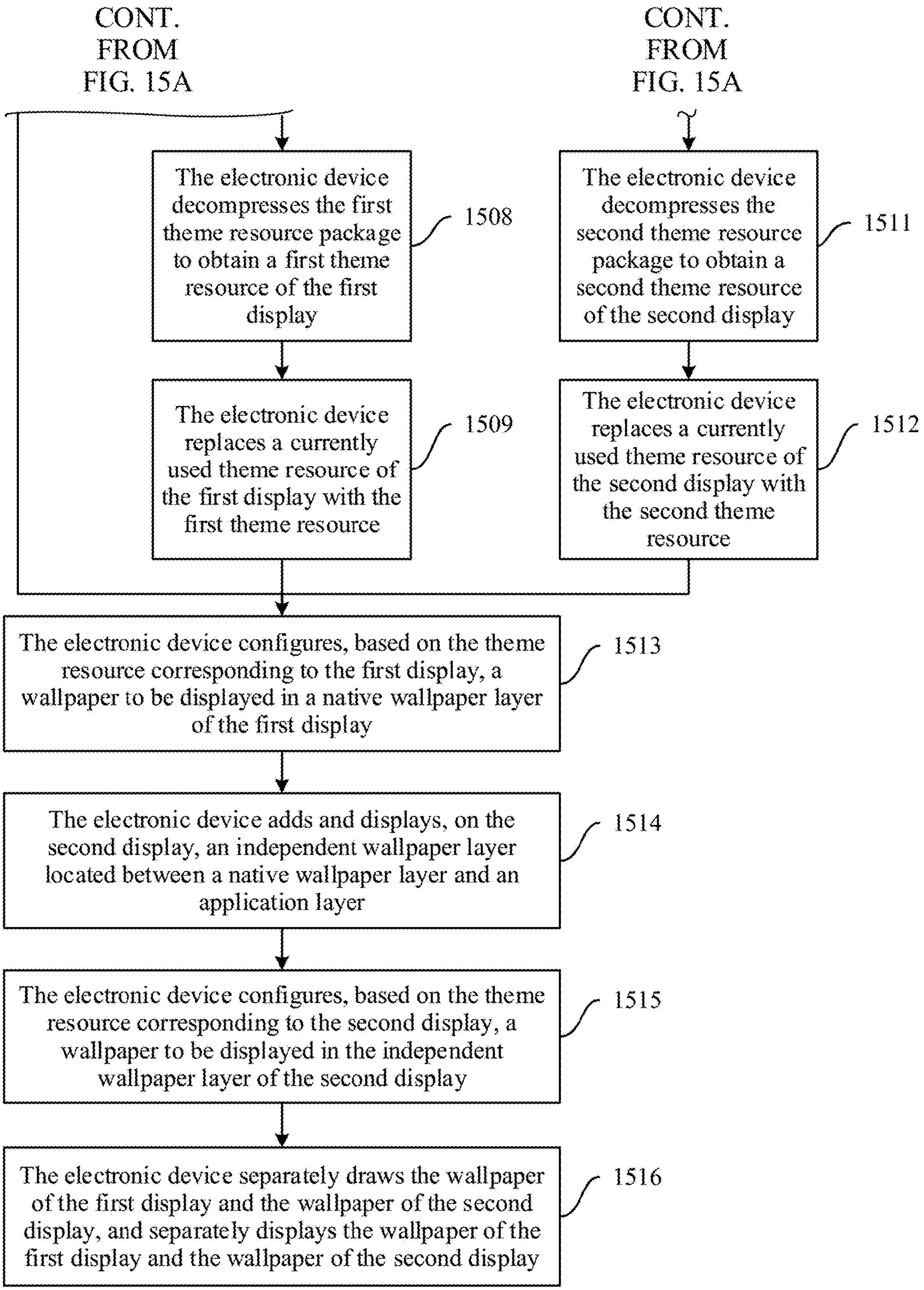

As shown in FIG. 15A and FIG. 15B, a procedure of a wallpaper display method provided in an embodiment of this application may include the following steps.

S1501: An electronic device receives an operation performed by a user on the electronic device.

When the user needs to set a wallpaper, the user may perform an operation on a wallpaper setting entrance provided by the electronic device, select a display on which the wallpaper needs to be set and a picture used as the wallpaper, and indicate the electronic device to set the selected picture as the wallpaper of the display.

S1502: The electronic device determines, based on the operation performed by the user, whether a wallpaper is set for a plurality of displays; and if the wallpaper is set for the plurality of displays, performs step S1503; or if the wallpaper is not set for the plurality of displays, performs step S1505.

If the electronic device determines that the wallpaper is not set for the plurality of displays, the electronic device may determine that the wallpaper is set only for the first display or only for the second display.

S1503: The electronic device obtains a combined theme resource package corresponding to the picture selected by the user.

S1504: The electronic device decompresses the combined theme resource package to obtain theme resources corresponding to the first display and the second display, and performs step S1513.

S1505: The electronic device determines a target display on which the wallpaper needs to be set, where the target display is the first display or the second display.

S1506: The electronic device determines whether the target display is an irregular screen; and if the target display is an irregular screen, performs step S1507; or if the target display is not an irregular screen, performs step S1510.

If the electronic device determines that the target display is the irregular screen, the electronic device determines that the wallpaper is set only for the second display; otherwise, the electronic device determines that the wallpaper is set only for the first display.

S1507: The electronic device obtains a first theme resource package that corresponds to the picture selected by the user and that is adapted to the first display.

S1508: The electronic device decompresses the first theme resource package to obtain a first theme resource of the first display.

S1509: The electronic device replaces a currently used theme resource of the first display with the first theme resource, and performs step S1513.

S1510: The electronic device obtains a second theme resource package that corresponds to the picture selected by the user and that is adapted to the second display.

S1511: The electronic device decompresses the second theme resource package to obtain a second theme resource of the second display.

S1512: The electronic device replaces a currently used theme resource of the second display with the second theme resource, and performs step S1513.

S1513: The electronic device configures, based on the theme resource corresponding to the first display, a wallpaper to be displayed in a native wallpaper layer of the first display.

S1514: The electronic device adds and displays, on the second display, an independent wallpaper layer located between a native wallpaper layer and an application layer.

S1515: The electronic device configures, based on the theme resource corresponding to the second display, a wallpaper to be displayed in the independent wallpaper layer of the second display.

S1516: The electronic device separately draws the wallpaper of the first display and the wallpaper of the second display, and separately displays the wallpaper of the first display and the wallpaper of the second display.

It should be noted that the specific implementation procedure provided in the foregoing instance is merely an example for describing a procedure of the method applicable to embodiments of this application. For specific execution, refer to the descriptions in the foregoing embodiments. In addition, an execution sequence of the steps may be adjusted based on an actual requirement, or other steps may be added, or some steps may be reduced.

In the foregoing instance, the electronic device can implement separate control on a single display by adding, to the display, an independent wallpaper window that covers a native wallpaper window. For example, in the two displays of the electronic device, management of one display may be completed by using an Android native service framework, and the other display may cover an Android native wallpaper window by using a customized wallpaper window, so that an effect in which separately setting a wallpaper on one display can be implemented when the other display remains unchanged. Therefore, this solution can improve flexibility of displaying a wallpaper on a plurality of displays.

Figure 16:
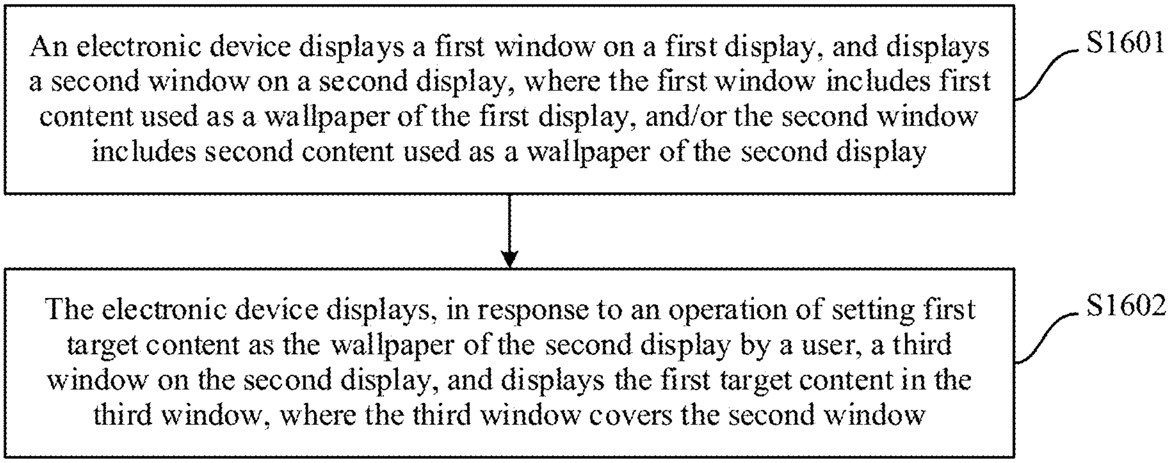
FIG. 16 is a schematic diagram of a wallpaper display method according to an embodiment of this application.

Based on the foregoing embodiment and a same concept, an embodiment of this application further provides a wallpaper display method. As shown in FIG. 16, the method includes the following steps.

S1601: An electronic device displays a first window on a first display, and displays a second window on a second display, where the first window includes first content used as a wallpaper of the first display, and/or the second window includes second content used as a wallpaper of the second display.

S1602: The electronic device displays, in response to an operation of setting first target content as the wallpaper of the second display by a user, a third window on the second display, and displays the first target content in the third window, where the third window covers the second window.

Specifically, for specific steps performed by the electronic device in the method, refer to the foregoing embodiments. Details are not described herein again.

Figure 17:
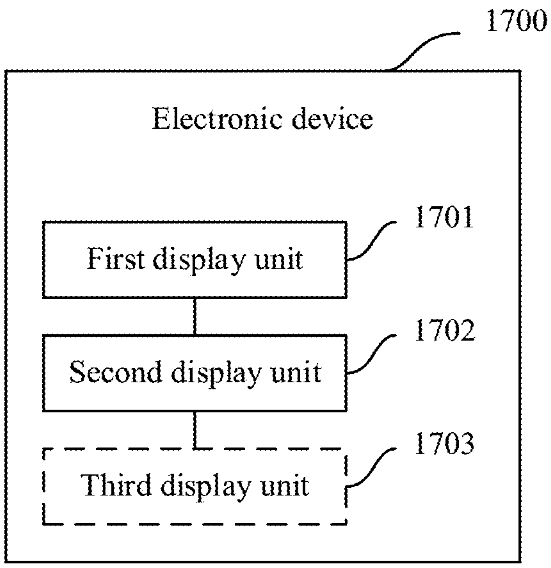
FIG. 17 is a schematic diagram of an electronic device according to an embodiment of this application.

Based on the foregoing embodiments and a same concept, an embodiment of this application further provides an electronic device. The electronic device is configured to implement the wallpaper display method provided in embodiments of this application. As shown in FIG. 17, the electronic device 1700 includes:

a first display unit 1701, configured to display a first window on a first display, and display a second window on a second display, where the first window includes first content used as a wallpaper of the first display, and/or the second window includes second content used as a wallpaper of the second display; and a second display unit 1702, configured to: in response to an operation of setting first target content as the wallpaper of the second display by a user, display a third window on the second display, and display the first target content in the third window, where the third window covers the second window.

In a possible design, the first display is a primary screen, and the second display is a secondary screen; or the first display is a secondary screen, and the second display is a primary screen.

In a possible design, the first target content is different from the second content; or a part of the first target content is from the second content.

In a possible design, an entire region of the third window is a non-transparent region; or a partial region of the third window is a transparent region.

In a possible design, the electronic device further includes a third display unit 1703, configured to display a fourth window on the second display, where the fourth window covers the third window, and the fourth window includes third content.

In a possible design, the third content includes at least one element, and a region other than the at least one element in the fourth window is a non-transparent region.

In a possible design, the element includes a control and/or an icon.

In a possible design, the second display unit 1702 is further configured to: in response to an operation of setting second target content as the wallpaper of the second display by the user, update the first target content in the third window to the second target content.

In a possible design, that the second display unit 1702 updates the first target content in the third window to the second target content includes: obtaining first target configuration information, where the first target configuration information is used to configure the second target content as the wallpaper of the second display; replacing stored second target configuration information with the first target configuration information, where the second target configuration information is used to configure the first target content as the wallpaper of the second display; and displaying the second target content in the third window based on a configuration of the first target configuration information.

In a possible design, the first display unit 1701 is further configured to: in response to an operation of setting third target content as the wallpaper of the first display by the user, update the first content in the first window to the third target content, where content in the second window changes with an update of content in the first window, and content in the third window remains unchanged.

In a possible design, that the first display unit 1701 updates the first content in the first window to the third target content includes: obtaining third target configuration information, where the third target configuration information is used to configure the third target content as the wallpaper of the first display; replacing stored fourth target configuration information with the third target configuration information, where the fourth target configuration information is used to configure the first content as the wallpaper of the first display; and displaying the third target content in the first window based on a configuration of the third target configuration information.

In a possible design, the first target content is a picture, a video, or an animation.

In a possible design, a size of the third window is greater than or equal to a size of the second window.

Figure 18:
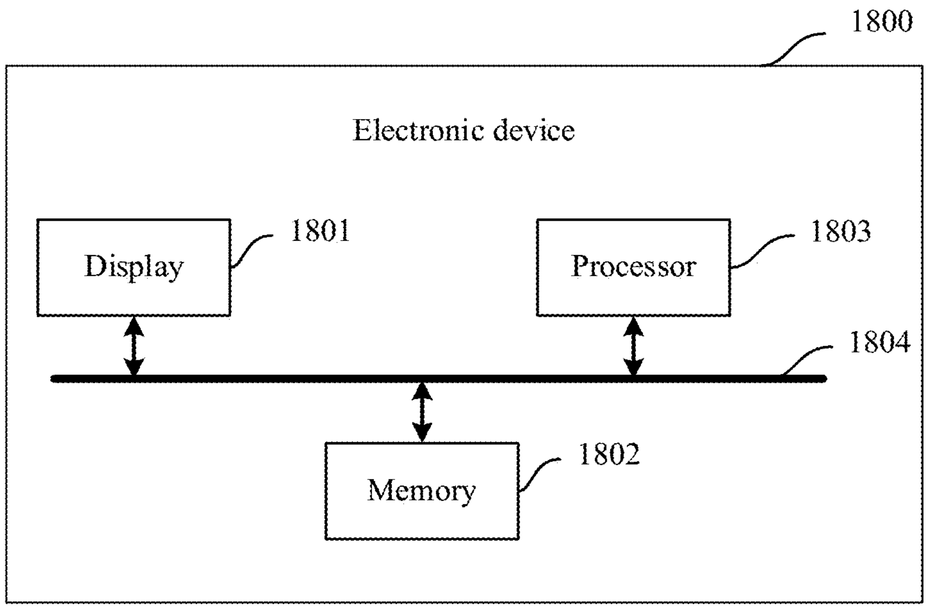
FIG. 18 is a schematic diagram of a structure of an electronic device according to an embodiment of this application.

Based on the foregoing embodiments and a same concept, an embodiment of this application further provides an electronic device. The electronic device is configured to implement the wallpaper display method provided in embodiments of this application. As shown in FIG. 18, the electronic device 1800 may include a plurality of displays 1801, a memory 1802, one or more processors 1803, and one or more computer programs (not shown in the figure). The foregoing components may be coupled through one or more communication buses 1804.

The plurality of displays 1801 are configured to display related user interfaces such as an image, a video, and an application interface. The memory 1802 stores one or more computer programs (e.g., code), and the one or more computer programs include computer instructions. The one or more processors 1803 invoke the computer instructions stored in the memory 1802, so that the electronic device 1800 performs the wallpaper display method provided in embodiments of this application.

During specific implementation, the memory 1802 may include a high-speed random access memory, and may also include a nonvolatile memory like one or more disk storage devices, a flash device, or another nonvolatile solid-state storage device. The memory 1802 may store an operating system (briefly referred to as a system below), for example, an embedded operating system like Android, IOS, Windows, or Linux. The memory 1802 may be configured to store an implementation program in embodiments of this application. The memory 1802 may further store a network communication program. The network communication program may be used to communicate with one or more additional devices, one or more user equipments, or one or more network devices. The one or more processors 1803 may be a general-purpose central processing unit (CPU), a microprocessor, an application-specific integrated circuit (ASIC), or one or more integrated circuits configured to control execution of programs in the solutions in this application.

It should be noted that FIG. 18 is merely an implementation of the electronic device 1800 provided in this embodiment of this application. In actual application, the electronic device 1800 may further include more or fewer components. This is not limited herein.

Based on the foregoing embodiments and a same concept, an embodiment of this application further provides a computer-readable storage medium. The computer-readable storage medium stores a computer program. When the computer program is run on a computer, the computer is enabled to perform the wallpaper display method provided in the foregoing embodiments.

Based on the foregoing embodiments and a same concept, an embodiment of this application further provides a computer program product. The computer program product includes a computer program or instructions. When the computer program or the instruction are run on a computer, the computer is enabled to perform the wallpaper display method provided in the foregoing embodiments.

All or some of the methods in embodiments of this application may be implemented by using software, hardware, firmware, or any combination thereof. When software is used to implement the foregoing embodiments, all or some of embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clearly that, a person skilled in the art can make various modifications and variations to this application without departing from the scope of this application. In this way, this application is intended to cover these modifications and variations of this application provided that they fall within the scope of protection defined by the following claims and their equivalent technologies.

What is claimed is:

1. A method, applied to an electronic device, the method comprising:

displaying a first window on a first display, and displaying a second window on a second display, wherein the first window comprises first content used as a wallpaper of the first display, and the second window comprises second content used as a wallpaper of the second display; and in response to an operation of setting first target content as the wallpaper of the second display by a user:

displaying a third window on the second display;

displaying the first target content in the third window, wherein the third window covers the second window; and in response to an operation of setting third target content as the wallpaper of the first display by the user, updating the first content in the first window to the third target content, wherein content in the second window changes with an update of content in the first window, and content in the third window remains unchanged.

2. The method according to claim 1, wherein the first display comprises a primary screen, and the second display comprises a secondary screen.

3. The method according to claim 1, wherein the first display comprises a secondary screen, and the second display comprises a primary screen.

4. The method according to claim 1, wherein the first target content is different from the second content.

5. The method according to claim 1, wherein a part of the first target content is from the second content.

6. The method according to claim 1, wherein an entire region of the third window comprises a non-transparent region.

7. The method according to claim 1, wherein a partial region of the third window comprises a transparent region.

8. The method according to claim 1, further comprising: displaying a fourth window on the second display, wherein the fourth window covers the third window, and the fourth window comprises third content.

9. The method according to claim 1, further comprising: in response to an operation of setting second target content as the wallpaper of the second display by the user, updating the first target content in the third window to the second target content.

10. The method according to claim 9, wherein updating the first target content in the third window to the second target content comprises:

obtaining first target configuration information, wherein the first target configuration information is used to configure the second target content as the wallpaper of the second display;

replacing stored second target configuration information with the first target configuration information, wherein the second target configuration information is used to configure the first target content as the wallpaper of the second display; and displaying the second target content in the third window based on a configuration of the first target configuration information.

11. The method according to claim 1, wherein updating the first content in the first window to the third target content comprises:

obtaining third target configuration information, wherein the third target configuration information is used to configure the third target content as the wallpaper of the first display;

replacing stored fourth target configuration information with the third target configuration information, wherein the fourth target configuration information is used to configure the first content as the wallpaper of the first display; and displaying the third target content in the first window based on a configuration of the third target configuration information.

12. The method according to claim 1, wherein the first target content comprises a picture, a video, or an animation.

13. The method according to claim 1, wherein a size of the third window is greater than or equal to a size of the second window.

14. The method according to claim 1, wherein the third window is located at an independent wallpaper layer of the second display, the independent wallpaper layer being between a native wallpaper layer at which the second window is located and an application layer of the second display.

15. An electronic device comprising:

one or more processors; and at least one non-transitory computer readable medium storing computer-executable instructions, wherein the one or more processors are configured to execute the computer-executable instructions to cause the electronic device to:

display a first window on a first display, and display a second window on a second display, wherein the first window comprises first content used as a wallpaper of the first display, and the second window comprises second content used as a wallpaper of the second display; and in response to an operation of setting first target content as the wallpaper of the second display by a user:

display a third window on the second display;

display the first target content in the third window, wherein the third window covers the second window; and in response to an operation of setting third target content as the wallpaper of the first display by the user, update the first content in the first window to the third target content, wherein content in the second window changes with an update of content in the first window, and content in the third window remains unchanged.

16. The electronic device according to claim 15, wherein the first display comprises a primary screen, and the second display comprises a secondary screen; or the first display comprises a secondary screen, and the second display comprises a primary screen.

17. The electronic device according to claim 15, wherein the first target content is different from the second content; or a part of the first target content is from the second content.

18. The electronic device according to claim 15, wherein an entire region of the third window comprises a non-transparent region; or a partial region of the third window comprises a transparent region.

19. The electronic device according to claim 15, wherein the third window is located at an independent wallpaper layer of the second display, the independent wallpaper layer being between a native wallpaper layer at which the second window is located and an application layer of the second display.

20. A non-transitory computer readable medium storing computer-executable instructions, wherein the computer-executable instructions, when executed by at least one processor, enable an electronic device to:

display a first window on a first display, and display a second window on a second display, wherein the first window comprises first content used as a wallpaper of the first display, and the second window comprises second content used as a wallpaper of the second display; and in response to an operation of setting first target content as the wallpaper of the second display by a user:

display a third window on the second display;

display the first target content in the third window, wherein the third window covers the second window; and in response to an operation of setting third target content as the wallpaper of the first display by the user, update the first content in the first window to the third target content, wherein content in the second window changes with an update of content in the first window, and content in the third window remains unchanged.

* * * * *